US012799351B2

(12) United States Patent
Takashita

(10) Patent No.: US 12,799,351 B2
(45) Date of Patent: Nov. 17, 2026

(54) COMPOSITION, SUBSTRATE WITH SURFACE LAYER, METHOD FOR PRODUCING SUBSTRATE WITH SURFACE LAYER, COMPOUNDS, AND METHODS FOR PRODUCING COMPOUNDS

(71) Applicant: AGC INC., Tokyo (JP)

(72) Inventor: Ryuta Takashita, Tokyo (JP)

(73) Assignee: AGC Inc., Tokyo (JP)

( * ) Notice: Subject to any disclaimer, the term of this patent is extended or adjusted under 35 U.S.C. 154(b) by 730 days.

(21) Appl. No.: 18/118,845

(22) Filed: Mar. 8, 2023

(65) Prior Publication Data

US 2023/0220236 A1 Jul. 13, 2023

Related U.S. Application Data

(63) Continuation of application No. PCT/JP2021/033357, filed on Sep. 10, 2021.

(30) Foreign Application Priority Data

Sep. 16, 2020 (JP) ................................ 2020-155260

(51) Int. Cl.

| | |
|---|---|
| ***C09D 171/00*** | (2006.01) |
| ***C07F 7/18*** | (2006.01) |
| ***C08G 65/48*** | (2006.01) |
| ***C08L 71/00*** | (2006.01) |
| ***C09D 5/00*** | (2006.01) |

(52) U.S. Cl.

CPC .......... *C09D 171/00* (2013.01); *C07F 7/1804* (2013.01); *C07F 7/1872* (2013.01); *C08G 65/48* (2013.01); *C08L 71/00* (2013.01); *C09D 5/00* (2013.01)

(58) Field of Classification Search

CPC ............. C08L 71/00; C07F 7/18; C08G 65/48

USPC .......................................................... 523/169

See application file for complete search history.

(56) References Cited

U.S. PATENT DOCUMENTS

| | | | | |
|---|---|---|---|---|
| 11,773,216 B2 * | 10/2023 | Matsuura | C07F 7/1804 | |
| | | | 524/463 | |
| 2002/0019483 A1 | 2/2002 | Sato et al. | | |
| 2021/0269594 A1 * | 9/2021 | Griffin | B32B 7/04 | |

FOREIGN PATENT DOCUMENTS

| | | | |
|---|---|---|---|
| JP | S61-5032 A | 1/1986 | |
| JP | 2012102187 A | 5/2012 | |
| JP | 2019043070 A | 3/2019 | |
| KR | 1020170095185 A | 8/2017 | |
| WO | WO-2002018457 | 3/2002 | |
| WO | WO-2003022906 | 3/2003 | |
| WO | WO-2017022437 A1 | 2/2017 | |
| WO | WO-2020111010 A1 * | 6/2020 | C09D 201/10 |

OTHER PUBLICATIONS

International Search Report issued Nov. 16, 2021 in PCT/JP2021/033357 (with English translation), 6 pages.

* cited by examiner

*Primary Examiner* — Deve V Hall

(74) *Attorney, Agent, or Firm* — Element IP, PLC

(57) ABSTRACT

The object is to provide a composition capable of forming a surface layer with excellent abrasion resistance, a substrate with a surface layer, and a method for producing a substrate with a surface layer. It is also an object to provide new compounds and their production methods.

The composition of the invention comprises a first component made of a fluorinated ether compound having a poly (oxyfluoroalkylene) chain and a reactive silyl group, and at least one type of second component selected from compound (A) ($R^{fa}$—$(OX^a)_{m1}$-$L^a$-$CZ^{a1}$=$CH_2$) and compound (B) ($CH_2$=$CZ^{b2}$-$L^{b2}$-$(OX^b)_{m2}$-$L^{b1}$-$CZ^{b1}$=$CH_2$), where $R^{fa}$ is a fluoroalkyl group, $X^a$ and $X^b$ are fluoroalkylene groups, $L^a$ is a single bond or a divalent linking group (but excluding $(OX^a)_{na}$), $L^{b1}$ and $L^{b2}$ are single bonds or divalent linking groups (but excluding $(OX^b)_{nb}$), $Z^{a1}$, $Z^{b1}$ and $Z^{b2}$ are fluorine atoms or trifluoromethyl groups, and m1 and m2 are integers of 2 or more.

16 Claims, No Drawings

COMPOSITION, SUBSTRATE WITH SURFACE LAYER, METHOD FOR PRODUCING SUBSTRATE WITH SURFACE LAYER, COMPOUNDS, AND METHODS FOR PRODUCING COMPOUNDS

TECHNICAL FIELD

The present invention relates to a composition, a substrate with a surface layer, a method for producing a substrate with a surface layer, compounds, and methods for producing the compounds.

BACKGROUND ART

In order to impart water and oil repellency, fingerprint stain removability, lubricity (smoothness when touched with a finger), etc. to the surface of a substrate, it is known to form a surface layer made of a condensation product of a fluorinated ether compound, on the surface of the substrate, by surface treatment using a fluorinated ether compound having a poly(oxyperfluoroalkylene) chain and a hydrolyzable silyl group (Patent Document 1).

PRIOR ART DOCUMENT

Patent Document

Patent Document 1: WO2017/022437

DISCLOSURE OF INVENTION

Technical Problem

In recent years, the performance required for the surface layer formed by using a fluorinated ether compound has been increasing. For example, when the surface layer is applied to a component constituting a surface that is to be touched by a finger, a surface layer whose performance (e.g. water repellency) is less likely to be deteriorated even by repeated abrasion, i.e. a surface layer excellent in abrasion resistance, is required.

When the present inventors evaluated the surface layer formed by using the fluorinated ether compound as described in Patent Document 1, they found that there was room for improvement in the abrasion resistance of the surface layer.

Therefore, the present invention has an object to provide a composition capable of forming a surface layer excellent in abrasion resistance, a substrate with a surface layer, and a method for producing a substrate with a surface layer. Further, the present invention also has an object to provide new compounds and their production methods.

Solution to Problem

The present inventors have found it possible to accomplish the above objects by the following constructions.

[1] A composition characterized by comprising a first component made of a fluorinated ether compound having a poly(oxyfluoroalkylene) chain and a reactive silyl group, and at least one type of second component selected from the group consisting of a compound represented by the following formula (A) and a compound represented by the following formula (B):

$$R^{fa}—(OX^a)_{m1}\text{-}L^a\text{-}CZ^{a1}{=}CH_2 \qquad (A)$$

where in the formula (A), $R^{fa}$ is a $C_{1-20}$ fluoroalkyl group, $X^a$ is a $C_{1-6}$ fluoroalkylene group, $L^a$ is a single bond or a divalent linking group (but excluding $(OX^a)_{na}$ where na is an integer of 1 or more), $Z^{a1}$ is a fluorine atom or a trifluoromethyl group, and m1 is an integer of 2 or more, $$CH_2{=}CZ^{b2}\text{-}L^{b2}\text{-}(OX^b)_{m2}\text{-}L^{b1}\text{-}CZ^{b1}{=}CH_2 \qquad (B)$$

where in the formula (B), $X^b$ is a $C_{1-6}$ fluoroalkylene group, $L^{b1}$ and $L^{b2}$ are each independently a single bond or a divalent linking group (but excluding $(OX^b)_{nb}$ where nb is an integer of 1 or more), $Z^{b1}$ and $Z^{b2}$ are each independently a fluorine atom or a trifluoromethyl group, and m2 is an integer of 2 or more.

[2] The composition according to [1], wherein $Z^{a1}$ in the formula (A) is a fluorine atom.

[3] The composition according to [1] or [2], wherein $L^a$ in the formula (A) is an alkylene group, an etheric oxygen atom, an amide bond or a group having them combined, or a single bond.

[4] The composition according to [3], wherein $L^a$ in the formula (A) is a single bond.

[5] The composition according to any one of [1] to [4], wherein $Z^{b1}$ and $Z^{b2}$ in the formula (B) are each a fluorine atom.

[6] The composition according to any one of [1] to [5], wherein $L^{b1}$ and $L^{b2}$ in the formula (B) are each independently an alkylene group, an etheric oxygen atom, an amide bond or a group having them combined, or a single bond.

[7] The composition according to [6], wherein $L^{b2}$ in the formula (B) is a single bond.

[8] The composition according to any one of [1] to [7], wherein the mass ratio of the content of the second component to the content of the first component is from 0.01 to 4.0.

[9] A substrate with a surface layer, characterized by comprising a substrate and a surface layer formed from the composition as defined in any one of [1] to [8], on the substrate.

[10] A method for producing a substrate with a surface layer, which comprises forming, on a substrate, a surface layer by a dry coating method or a wet coating method using the composition as defined in any one of [1] to [8].

[11] A compound characterized by being represented by the following formula (A):

$$R^{fa}—(OX^a)_{m1}\text{-}L^a\text{-}CZ^{a1}{=}CH_2 \qquad (A)$$

where in the formula (A), $R^{fa}$ is a $C_{1-20}$ fluoroalkyl group, $X^a$ is a $C_{1-6}$ fluoroalkylene group, $L^a$ is a single bond or a divalent linking group (but excluding $(OX^a)_{na}$ where na is an integer of 1 or more), $Z^{a1}$ is a fluorine atom or a trifluoromethyl group, and m1 is an integer of 2 or more.

[12] A compound characterized by being represented by the following formula (B):

$$CH_2{=}CZ^{b2}\text{-}L^{b2}\text{-}(OX^b)_{m2}\text{-}L^{b1}\text{-}CZ^{b1}{=}CH_2 \qquad (B)$$

where in the formula (B), $X^b$ is a $C_{1-6}$ fluoroalkylene group, $L^{b1}$ and $L^{b2}$ are each independently a single bond or a divalent linking group (but excluding $(OX^b)_{nb}$ where nb is an integer of 1 or more), $Z^{b1}$ and $Z^{b2}$ are each independently a fluorine atom or a trifluoromethyl group, and m2 is an integer of 2 or more.

[13] A method for producing a compound, characterized by reacting a metal or an organometallic reagent, and a compound represented by the following formula (a1) to obtain a compound represented by the following formula (A):

$$R^{fa}\text{—}(OX^a)_{m1}\text{-}L^a\text{-}CFZ^{a1}\text{—}CH_2\text{-}Q^{a1} \qquad (a1)$$

$$R^{fa}\text{—}(OX^a)_{m1}\text{-}L^a\text{-}CZ^{a1}{=}CH_2 \qquad (A)$$

where in the formula (a1) and formula (A), $R^{fa}$ is a $C_{1-20}$ fluoroalkyl group, $X^a$ is a $C_{1-6}$ fluoroalkylene group, $L^a$ is a single bond or a divalent linking group (but excluding $(OX^a)_{na}$ where na is an integer of 1 or more), $Z^{a1}$ is a fluorine atom or a trifluoromethyl group, $Q^{a1}$ is a leaving group, and m1 is an integer of 2 or more.

[14] A method for producing a compound, characterized by reacting a metal or an organometallic reagent and a compound represented by the following formula (b1) to obtain a compound represented by the following formula (B):

$$Q^{b2}\text{-}CH_2\text{—}CFZ^{b2}\text{-}L^{b2}\text{-}(OX^b)_{m2}\text{-}L^{b1}\text{-}CFZ^{b1}\text{—}CH_2\text{-}Q^{b1} \qquad (b1)$$

$$CH_2{=}CZ^{b2}\text{-}L^{b2}\text{-}(OX^b)_{m2}\text{-}L^{b1}\text{-}CZ^{b1}{=}CH_2 \qquad (B)$$

where in the formula (b1) and formula (B), $X^b$ is a $C_{1-6}$ fluoroalkylene group, $L^{b1}$ and $L^{b2}$ are each independently a single bond or a divalent linking group (but excluding $(OX^b)_{nb}$ where nb is an integer of 1 or more), $Z^{b1}$ and $Z^{b2}$ are each independently a fluorine atom or a trifluoromethyl group, $Q^{b1}$ and $Q^{b2}$ are each independently a leaving group, and m2 is an integer of 2 or more.

[15] A method for producing a compound according to [13] or [14], which is carried out in the presence of a fluorinated organic solvent.

Advantageous Effects of Invention

According to the present invention, it is possible to provide a composition capable of forming a surface layer excellent in abrasion resistance, a substrate with a surface layer, and a method for producing a substrate with a surface layer. Further, according to the present invention, it is also possible to provide new compounds and their production methods.

DESCRIPTION OF EMBODIMENTS

In this specification, a compound represented by the formula (A) will be referred to as compound (A). Compounds represented by other formulas will also be referred to in the same manner. A repeating unit represented by the formula (1) will be referred to as unit (1). Repeating units represented by other formulas will also be referred to in the same manner. A group represented by the formula (2) will be referred to as group (2). Groups represented by other formulas will also be referred to in the same manner.

In this specification, in a case where "an alkylene group may have an A group", the alkylene group may have an A group between carbon-carbon atoms in the alkylene group, or it may have an A group at a terminal, as an alkylene group-A group-.

In this specification, an "aryl group" in an "aryloxy group" includes not only an aryl group but also a heteroaryl group.

In this specification, a "linking group" refers not only to a group of atoms, but also an atom itself may be treated as a "linking group" if it has the function of linking the prescribed groups. For example, a nitrogen atom itself is treated as a trivalent linking group.

The meanings of terms in the present invention are as follows.

The "divalent organopolysiloxane residue" is a group represented by the following formula. $R^x$ in the following formula is an alkyl group (preferably $C_{1-10}$) or a phenyl group. Further, g1 is an integer of 1 or more, preferably an integer of from 1 to 9, particularly preferably an integer of from 1 to 4.

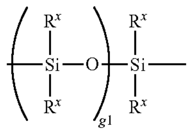

The "average molecular weight" of a compound is calculated by obtaining the number (average value) of oxyfluoroalkylene groups based on the terminal group by $^1H$-NMR and $^{19}F$-NMR.

[Composition]

The composition of the present invention comprises a first component made of a fluorinated ether compound having a poly(oxyfluoroalkylene) chain and a reactive silyl group (hereinafter referred to as a "specific fluorinated ether compound"), and at least one type of second component selected from the group consisting of compound (A) and compound (B).

The present inventors have found that when a surface layer is formed on a substrate by using the composition of the present invention, the water repellency and abrasion resistance of the surface layer will be improved. The details of the reason for this have not been clarified, but are assumed to be due to the following reasons.

Compound (A) has, at one terminal portion, a group represented by $\text{—}CZ^{a1}{=}CH_2$ ($Z^{a1}$ is a fluorine atom or a trifluoromethyl group). Further, compound (B) has, at both terminal portions, a group represented by $\text{—}CZ^{b1}{=}CH_2$ and a group represented by $CH_2{=}CZ^{b2}\text{—}$ ($Z^{b1}$ and $Z^{b2}$ are each independently a fluorine atom or a trifluoromethyl group).

Thus, the compound in which at least one of the terminals is "$=CH_2$" has a superior affinity with water as compared to such a compound in which both terminals are "$\text{—}CF_3$". Therefore, it is presumed that the progress of the hydrolysis reaction of the specific fluorinated ether compound contained in the composition of the present invention is accelerated when the surface layer is formed by using the composition of the present invention, and the water resistance and abrasion resistance of the obtained surface layer are improved.

<First Component>

The first component in the composition of the present invention is made of a specific fluorinated ether compound and is a compound having a poly(oxyfluoroalkylene) chain and a reactive silyl group.

The poly(oxyfluoroalkylene) chain contains a plurality of units (1).

(OX) (1)

X is a fluoroalkylene group having one or more fluorine atoms.

The number of carbon atoms in the fluoroalkylene group is preferably from 2 to 6, particularly preferably from 2 to 4, from such a viewpoint that the weather resistance and corrosion resistance of the surface layer will be superior.

The fluoroalkylene group may be any of linear, branched or cyclic.

The number of fluorine atoms in the fluoroalkylene group is preferably from 1 to 2 times, more preferably from 1.7 to 2 times, the number of carbon atoms, from such a viewpoint that the abrasion durability and water and oil repellency of the surface layer will be superior.

The fluoroalkylene group is particularly preferably a group in which all hydrogen atoms in the fluoroalkylene group are replaced by fluorine atoms (a perfluoroalkylene group).

Specific examples of unit (1) include —OCHF—, $—OCF_2CHF—$, $—OCHFCF_2—$, $—OCF_2CH_2—$, $—OCH_2CF_2—$, $—OCF_2CF_2CHF—$, $—OCHFCF_2CF_2—$, $—OCF_2CF_2CH_2—$, $—OCH_2CF_2CF_2—$, $—OCF_2CF_2CF_2CH_2—$, $—OCH_2CF_2CF_2CF_2—$, $—OCF_2CF_2CF_2CF_2CH_2—$, $—OCH_2CF_2CF_2CF_2CF_2—$, $—OCF_2CF_2CF_2CF_2CF_2CH_2—$, $—OCH_2CF_2CF_2CF_2CF_2CF_2—$, $—OCF_2—$, $—OCF_2CF_2—$, $—OCF_2CF_2CF_2—$, $—OCF(CF_3)CF_2—$, $—OCF_2CF_2CF_2CF_2—$, $—OCF(CF_3)CF_2CF_2—$, $—OCF_2CF_2CF_2CF_2CF_2—$, $—OCF_2CF_2CF_2CF_2CF_2CF_2—$, $—O\text{-cyclo}C_4F_6—$, $—O\text{-cyclo}C_5F_8—$ and $—O\text{-cyclo}C_6F_{10}—$.

Here, $\text{-cyclo}C_4F_6—$ means a perfluorocyclobutanediyl group, a specific example of which is a perfluorocyclobutane-1,2-diylgroup. $\text{-cyclo}C_5F_8—$ means a perfluorocyclopentanediyl group, a specific example of which is a perfluorocyclopentane-1,3-diylgroup. $\text{-cyclo}C_6F_{10}—$ means a perfluorocyclohexanediyl group, a specific example of which is a perfluorocyclohexane-1,4-diylgroup.

The number m of repeating units (1) in the poly(oxyfluoroalkylene) chain is an integer of 2 or more, preferably an integer of from 2 to 200, more preferably an integer of from 5 to 150, particularly preferably from 5 to 100, most preferably an integer of from 10 to 50.

The poly(oxyfluoroalkylene) chain may contain only one type of (OX) or may contain two or more types of (OX).

The bonding order of two or more types of (OX) is not limited and may be arranged randomly, alternatingly or in blocks.

"Containing two or more types of (OX)" means that in the fluorinated ether compound, two or more types of (OX) different in number of carbon atoms are present, two or more types of (OX) different in number of hydrogen atoms are present, two or more types of (OX) different in positions of hydrogen atoms are present, and two or more types of (OX) different in the presence or absence of side chains, or in types of side chains (such as the number of side chains, or the number of carbon atoms in side chains) even if the numbers of carbon atoms are the same.

With respect to the arrangement of two or more types of (OX), for example, the structure represented by $\{(OCF_2)_{m21}\cdot(OCF_2CF_2)_{m22}\}$ represents that m21 $(OCF_2)$ and m22 $(OCF_2CF_2)$ are randomly arranged. Further, the structure represented by $(OCF_2CF_2—OCF_2CF_2CF_2CF_2)_{m25}$ represents that m25 $(OCF_2CF_2)$ and m25 $(OCF_2CF_2CF_2CF_2)$ are arranged alternately.

As $(OX)_m$ representing a poly(oxyfluoroalkylene) chain, $[(OCH_{ma}F_{(2\text{-}ma)})_{m11}\cdot(OC_2H_{mb}F_{(4\text{-}mb)})_{m12}\cdot(OC_3H_{mc}F_{(6\text{-}mc)})_{m13}\cdot(OC_4H_{md}F_{(8\text{-}md)})_{m14}\cdot(OC_5H_{me}F_{(10\text{-}me)})_{m15}\cdot(OC_6H_{mf}F_{(12\text{-}mf)})_{m16}\cdot(O\text{-cyclo}C_4H_{mg}F_{(6\text{-}mg)})_{m17}\cdot(O\text{-cyclo}C_5H_{mh}F_{(8\text{-}mh)})_{m18}\cdot(O\text{-cyclo}C_6H_{mi}F_{(10\text{-}mi)})_{m19}]$ is preferred. Here, $\text{-cyclo}C_4H_{mg}F_{(6\text{-}mg)}$ represents a fluorocyclobutanediyl group, and a fluorocyclobutane-1,2-diylgroup is preferred. $\text{-cyclo}C_5H_{mh}F_{(8\text{-}mh)}$ represents a fluorocyclopentanediyl group, and a fluorocyclopentane-1,3-diylgroup is preferred. $\text{-cyclo}C_6H_{mi}F_{(10\text{-}mi)}$ represents a fluorocyclohexanediyl group, and a fluorocyclohexane-1,4-diylgroup is preferred.

ma is 0 or 1, mb is an integer of from 0 to 3, mc is an integer of from 0 to 5, and is an integer of from 0 to 7, me is an integer of from 0 to 9, mf is an integer of from 0 to 11, mg is an integer of from 0 to 5, mh is an integer of from 0 to 7, and mi is an integer of from 0 to 9.

m11, m12, m13, m14, m15, m16, m17, m18 and m19 are each independently an integer of 0 or more, and preferably at most 100.

m11+m12+m13+m14+m15+m16+m17+m18+m19 is an integer of 2 or more, preferably an integer of from 2 to 200, more preferably an integer of from 5 to 150, further preferably an integer of from 5 to 100, particularly preferably an integer of from 10 to 50.

Among them, m12 is preferably an integer of 2 or more, particularly preferably an integer of from 2 to 200.

Further, $C_3H_{mc}F_{(6\text{-}mc)}$, $C_4H_{md}F_{(8\text{-}md)}$, $C_5H_{me}F_{(10\text{-}me)}$ and $C_6H_{mf}F_{(12\text{-}mf)}$ may be linear or branched, and preferably linear from such a viewpoint that the abrasion resistance of the surface layer will be superior.

Further, the bonding order of m11 $(OCH_{ma}F_{(2\text{-}ma)})$, m12 $(OC_2H_{mb}F_{(4\text{-}mb)})$, m13 $(OC_3H_{mc}F_{(6\text{-}mc)})$, m14 $(OC_4H_{md}F_{(8\text{-}md)})$, m15 $(OC_5H_{me}F_{(10\text{-}me)})$, m16 $(OC_6H_{mf}F_{(12\text{-}mf)})$, m17 $(O\text{-cyclo}C_4H_{mg}F_{(6\text{-}mg)})$, m18 $((O\text{-cyclo}C_5H_{mh}F_{(8\text{-}mh)})$ and m19 $(O\text{-cyclo}C_6H_{mi}F_{(10\text{-}mi)})$ is not limited.

In a case where m11 is 2 or more, multiple $(OCH_{ma}F_{(2\text{-}ma)})$ may be the same or different.

In a case where m12 is 2 or more, multiple $(OC_2H_{mb}F_{(4\text{-}mb)})$ may be the same or different.

In a case where m13 is 2 or more, multiple $(OC_3H_{mc}F_{(6\text{-}mc)})$ may be the same or different.

In a case where m14 is 2 or more, multiple $(OC_4H_{md}F_{(8\text{-}md)})$ may be the same or different.

In a case where m15 is 2 or more, multiple $(OC_5H_{me}F_{(10\text{-}mi)})$ may be the same or different.

In a case where m16 is 2 or more, multiple $(OC_6H_{mf}F_{(12\text{-}mf)})$ may be the same or different.

In a case where m17 is 2 or more, multiple $(O\text{-cyclo}C_4H_{mg}F_{(6\text{-}mg)})$ may be the same or different.

In a case where m18 is 2 or more, multiple $(O\text{-cyclo}C_5H_{mh}F_{(8\text{-}mh)})$ may be the same or different.

In a case where m19 is 2 or more, multiple $(O\text{-cyclo}C_6H_{mi}F_{(10\text{-}mi)})$ may be the same or different.

$(OX)_m$ is preferably ones having the following structures.

$\{(OCF_2)_{m21}\cdot(OCF_2CF_2)_{m22}\}$, $(OCF_2CF_2)_{m23}$, $(OCF(CF_3)CF_2)_{m23}$, $(OCF_2CF_2CF_2)_{m24}$, $(OCF_2CF_2—OCF_2CF_2CF_2CF_2)_{m25}$, $\{(OCF_2CF_2CF_2CF_2CF_2CF_2)_{m26}\cdot(OCF_2)_{m27}\}$, $\{(OCF_2CF_2CF_2CF_2CF_2)_{m26}\cdot(OCF_2CF_2)_{m27}\}$,
$\{(OCF_2CF_2CF_2CF_2CF_2CF_2)_{m26}\cdot(OCF_2)_{m27}\}$,
$\{(OCF_2CF_2CF_2CF_2CF_2CF_2)_{m26}\cdot(OCF_2CF_2)_{m27}\}$,
$(OCF_2CF_2CF_2CF_2CF_2—OCF_2)_{m28}$,
$(OCF_2CF_2CF_2CF_2CF_2—OCF_2CF_2)_{m28}$,
$(OCF_2CF_2CF_2CF_2CF_2CF_2—OCF_2)_{m28}$,
$(OCF_2CF_2CF_2CF_2CF_2CF_2—OCF_2CF_2)_{m28}$,
$(OCF_2—OCF_2CF_2CF_2CF_2CF_2)_{m28}$,
$(OCF_2—OCF_2CF_2CF_2CF_2CF_2CF_2)_{m28}$,
$(OCF_2CF_2—OCF_2CF_2CF_2CF_2CF_2)_{m28}$,
$(OCF_2CF_2—OCF_2CF_2CF_2CF_2CF_2CF_2)_{m28}$.

Here, m21 is an integer of 1 or more, m22 is an integer of 1 or more, m21+m22 is an integer of from 2 to 500, m23 and m24 are each independently an integer of from 2 to 500, m25 is an integer of from 1 to 250, m26 and m27 are each independently an integer of 1 or more, m26+m27 is an integer of from 2 to 500, and m28 is an integer of from 1 to 250.

$(OX)_m$ is more preferably ones having the following structures from such a viewpoint that the specific fluorinated ether compounds will be easily produced.

$\{(OCF_2)_{m21}\cdot(OCF_2CF_2)_{m22}\}$,
$(OCF(CF_3)CF_2)_{m23}$,
$(OCF_2CF_2CF_2)_{m24}$,
$(OCF_2CF_2)_2\{(OCF_2)_{m21}\cdot(OCF_2CF_2)_{m22-2}\}$,
$(OCF_2CF_2—OCF_2CF_2CF_2CF_2)_{m25-1}OCF_2CF_2$,
$(OCF_2CF_2CF_2CF_2CF_2—OCF_2)_{m28}$,
$(OCF_2CF_2CF_2CF_2CF_2CF_2—OCF_2)_{m28}$,
$(OCF_2CF_2—OCF_2CF_2CF_2CF_2CF_2)_{m28-1}OCF_2CF_2$,
$(OCF_2CF_2—OCF_2CF_2CF_2CF_2CF_2CF_2)_{m28-1}OCF_2CF_2$.

Here, with respect to m22-2, m25-1 and m28-1, so that they become integers of 1 or more, the numbers of m22, m25 and m28 are selected.

Among these, from such a viewpoint that the abrasion resistance of the surface layer will be superior, $(OX)_m$ is preferably $\{(OCF_2)_{m21}\cdot(OCF_2CF_2)_{m22}\}$.

In $\{(OCF_2)_{m21}\cdot(OCF_2CF_2)_{m22}\}$, m22/m21 is, from such a viewpoint that the abrasion resistance and finger print stain removability of the surface layer will be superior, preferably from 0.1 to 10, more preferably from 0.2 to 5.0, further preferably from 0.2 to 2.0, particularly preferably from 0.2 to 1.5, most preferably from 0.2 to 0.85.

The number average molecular weight of $(OX)_m$ is preferably from 1,000 to 20,000, more preferably from 2,000 to 15,000, particularly preferably from 3,000 to 10,000.

When the number average molecular weight is at least the above lower limit value, the molecular chain of the specific fluorinated ether compound becomes longer, whereby the flexibility of the molecular chain of the specific fluorinated ether compound will be improved. This increases the probability of reaction between the silanol groups derived from the reactive silyl groups of the specific fluorinated ether compound and the substrate or the base layer having silanol groups, so that the adhesiveness between the surface layer and the substrate or the base layer will be further improved. As a result, the abrasion resistance of the surface layer will be superior. Further, the fluorine content of the surface layer will be improved, whereby the water and oil repellency will be superior.

Further, when the number average molecular weight is at most the upper limit value, the handling efficiency at the time of film deposition will be superior.

As the reactive silyl group, Group (2) is preferred.

$$—Si(R)_nL_{3-n} \quad (2)$$

R is a monovalent hydrocarbon group.

The monovalent hydrocarbon group is preferably a monovalent aliphatic hydrocarbon group (which may be saturated or unsaturated) or a monovalent aromatic hydrocarbon group, more preferably a monovalent aliphatic hydrocarbon group, particularly preferably an alkyl group.

The monovalent hydrocarbon group may be linear, branched or cyclic, preferably linear or branched. The number of carbon atoms in the monovalent hydrocarbon group is preferably from 1 to 6, more preferably from 1 to 3, particularly preferably from 1 to 2.

L is a hydrolyzable group or a hydroxy group.

The hydrolyzable group for L is a group which becomes a hydroxy group by a hydrolysis reaction. That is, the hydrolyzable silyl group represented by Si-L becomes a silanol group represented by Si—OH by the hydrolysis reaction. Silanol groups further react with each other to form Si—O—Si bonds.

Specific examples of L being a hydrolyzable group include an alkoxy group, an aryloxy group, a halogen atom, an acyl group, an acyloxy group and an isocyanate group (—NCO). As the alkoxy group, a $C_{1-4}$ alkoxy group is preferred. As the aryloxy group, a $C_{3-10}$ aryloxy group is preferred. As the halogen atom, a chlorine atom is preferred. As the acyl group, a $C_{1-6}$ acyl group is preferred. As the acyloxy group, a $C_{1-6}$ acyloxy group is preferred.

As L, from such a viewpoint that the production of the specific fluorinated ether compound will be easier, a $C_{1-4}$ alkoxy group or a halogen atom is preferred. As L, from such a viewpoint that outgassing at the time of application is little, and the storage stability of the specific fluorinated ether compound is superior, a $C_{1-4}$ alkoxy group is preferred, and in a case where long-term storage stability of the specific fluorinated ether compound is required, an ethoxy group is particularly preferred, and in a case where the reaction time after the application is to be made short, a methoxy group is particularly preferred.

n is an integer of from 0 to 2.

n is preferably 0 or 1, particularly preferably 0. By the presence of a plurality of L, the adhesion of the surface layer to the substrate becomes to be stronger.

In a case where n is 0 or 1, the plurality of L present in one molecule may be the same or different. From the viewpoint of availability of raw materials and ease of production of the specific fluorinated ether compound, it is preferred that they are the same. In a case where n is 2, the plurality of R present in one molecule may be the same or different. From the viewpoint of availability of raw materials and ease of production of the specific fluorinated ether compound, it is preferred that they are the same.

As the specific fluorinated ether compound, compound (3) is preferred from such a viewpoint that the water and oil repellency and abrasion resistance of the film will be superior.

$$[A\text{-}(OX)_m—O—]_jZ[—Si(R)_nL_{3-n}]_g \quad (3)$$

A is a perfluoroalkyl group or $-Q[-Si(R)_nL_{3-n}]_k$.

The number of carbon atoms in the perfluoroalkyl group is preferably from 1 to 20, more preferably from 1 to 10, further preferably from 1 to 6, particularly preferably from 1 to 3, from such a viewpoint that the abrasion resistance of the film will be superior.

The perfluoroalkyl group may be linear or branched.

However, in a case where A is $-Q[-Si(R)_nL_{3-n}]_k$, j is 1.

As the perfluoroalkyl group, $CF_3—$, $CF_3CF_2—$, $CF_3CF_2CF_2—$, $CF_3CF_2CF_2CF_2—$, $CF_3CF_2CF_2CF_2CF_2—$, $CF_3CF_2CF_2CF_2CF_2CF_2—$, $CF_3CF(CF_3)—$ or the like, may be mentioned.

As the perfluoroalkyl group, from such a viewpoint that the water and oil repellency of the film will be superior, $CF_3$—, $CF_3CF_2$— or $CF_3CF_2CF_2$— is preferred.

Q is a (k+1)-valent linking group. As described below, k is an integer from 1 to 10. Therefore, as Q, a 2 to 11-valent linking group may be mentioned.

It is preferred that Q has at least one type of branching point (hereinafter referred to as "branching point P") selected from the group consisting of C, N, Si, a ring structure and a (k+1)-valent organopolysiloxane residue.

As the ring structure, from such a viewpoint that the specific fluorinated ether compound can easily be produced, and from such a viewpoint that the abrasion resistance, light resistance and chemical resistance of the surface layer will be superior, one type selected from the group consisting of a 3 to 8 membered aliphatic ring, a 3 to 8 membered aromatic ring, a 3 to 8 membered hetero ring and a fused ring consisting of two or more of these rings, is preferred, and the ring structures listed in the following formulas are particularly preferred.

The ring structure may have a substituent such as a halogen atom, an alkyl group (may contain an etheric oxygen atom between carbon-carbon atoms), a cycloalkyl group, an alkenyl group, an aryl group, an alkoxy group or an oxo group (=O).

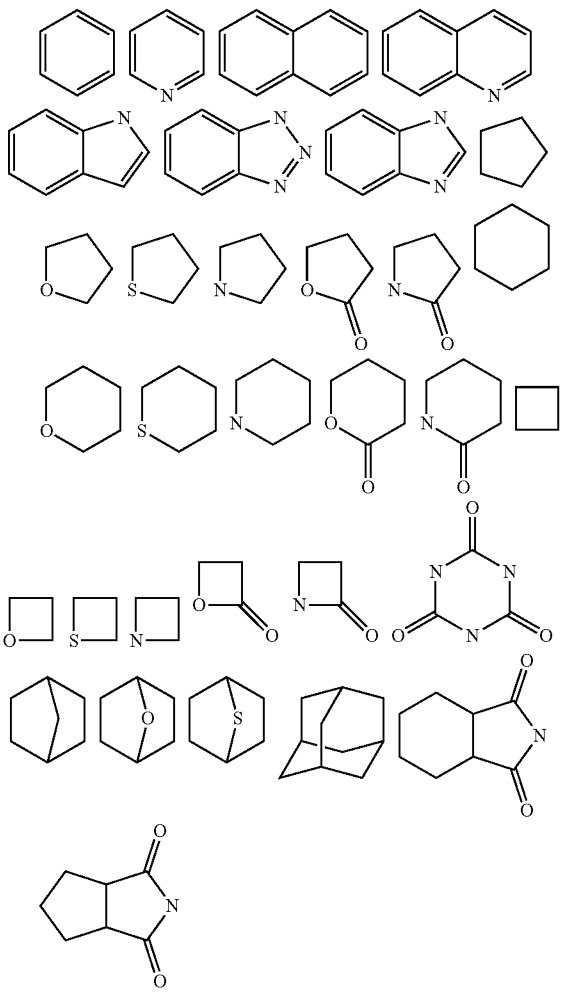

As specific examples of the (k+1)-valent organopolysiloxane residue, the following groups may be mentioned.

Here, $R^5$ in the following formulas is a hydrogen atom, an alkyl group, an alkoxy group, or a phenyl group. The number of carbon atoms in the alkyl group and the alkoxy group for $R^5$ is preferably from 1 to 10, particularly preferably 1.

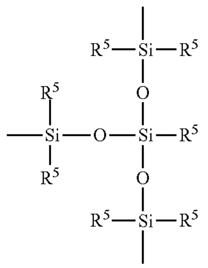

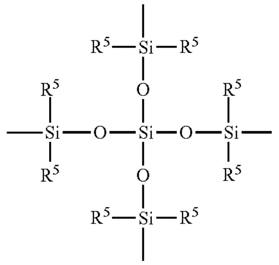

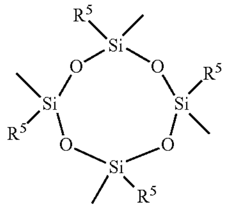

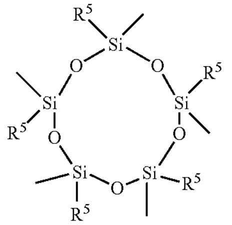

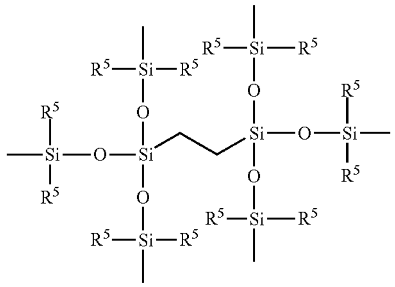

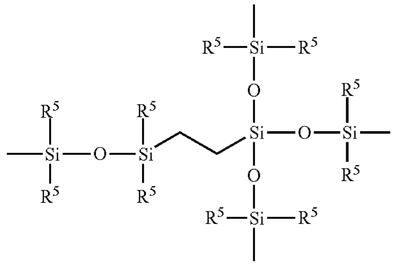

-continued

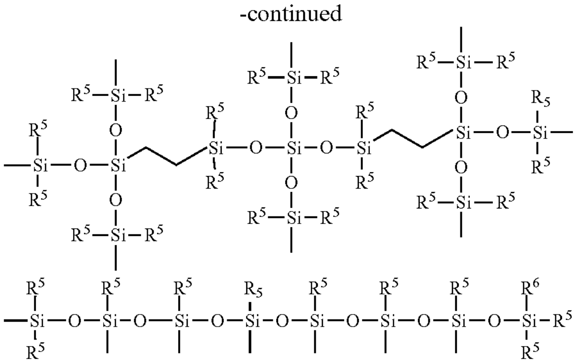

Q may have a group containing at least one type selected from an alkylene group, a fluoroalkylene group, a hydroxyalkylene group, an alkoxyalkylene group, a carbonyl group, an amide bond, an ether bond, a thioether bond, an urea bond, an urethane bond, a carbonate bond, an ester bond, $—SO_2NR^6—$, $—Si(R^6)_2—$, $—OSi(R^6)_2—$, $—Si(CH_3)_2\text{-Ph-}Si(CH_3)_2—$ and a divalent organopolysiloxane residue.

Here, $R^6$ is a hydrogen atom, a $C_{1-6}$ alkyl group or a phenyl group, and Ph is a phenylene group. The number of carbon atoms in the alkyl group for $R^6$ is preferably from 1 to 3, particularly preferably from 1 to 2, from such a viewpoint that the specific fluorinated ether compound can easily be produced.

Further, each bond or group constituting Q may have any terminal positioned on the $[A\text{-}(OX)_m—O\text{-}]_j$ side. For example, an amide bond may have the carbon atom positioned on the $[A\text{-}(OX)_m—O\text{-}]_j$ side, or may have the nitrogen atom positioned on the $[A\text{-}(OX)_m—O\text{-}]_j$ side. The same applies to other bonds and groups.

As specific examples of the divalent organopolysiloxane residue, groups of the following formulas may be mentioned. Here, $R^7$ in the following formulas is a hydrogen atom, an alkyl group, an alkoxy group or a phenyl group. The number of carbon atoms in the alkyl group and the alkoxy group for $R^7$ is preferably from 1 to 10, particularly preferably 1.

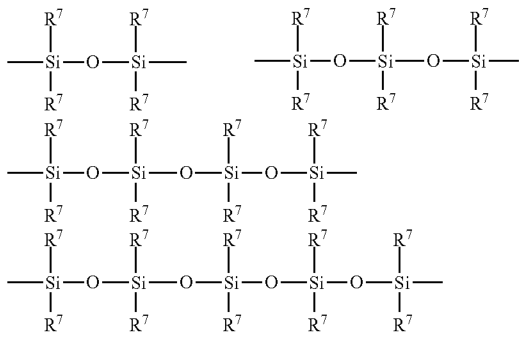

From such a viewpoint that the specific fluorinated ether compound can be easily produced, Q preferably has at least one type of bond selected from the group consisting of $—C(O)NR^6—$, $—C(O)—$, $—C(O)OR^6—$, $—NR^6—$ and $—O—$, and from such a viewpoint that the light resistance and chemical resistance of the surface layer will be excellent, it particularly preferably has $—C(O)NR^6—$ or $—C(O)—$.

As Q, a combination of two or more divalent hydrocarbon groups and one or more branching points P, or a combination of two or more hydrocarbon groups, one or more branching points P and one or more bonds B, may be mentioned.

As specific examples of the divalent hydrocarbon group, a divalent aliphatic hydrocarbon group (an alkylene group, a cycloalkylene group or the like) and a divalent aromatic hydrocarbon group (a phenylene group or the like) may be mentioned. The number of carbon atoms in the divalent hydrocarbon group is preferably from 1 to 10, more preferably from 1 to 6, particularly preferably from 1 to 4.

The definitions of R, L, n, X and m are as described above.

Z is a (j+g)-valent linking group.

The definition of Z is the same as in the above-described Q, except that in the above-described Q, the (k+1) valence is read as the (j+g) valence. In the specific fluorinated ether compound, Z and Q may be the same or different. From the viewpoint of easy production of the specific fluorinated ether compound, it is preferred that Z and Q are the same.

j is an integer of 1 or more, preferably an integer of from 1 to 5 from such a viewpoint that the water and oil repellency of the film will be superior, particularly preferably 1 from such a viewpoint that compound (3) can be easily produced.

g is an integer of 1 or more, preferably an integer of from 2 to 4, more preferably 2 or 3, particularly preferably 3, from such a viewpoint that the abrasion resistance of the film will be superior.

k is an integer of from 1 to 10, preferably an integer of from 1 to 8, particularly preferably an integer of from 2 to 6, from such a viewpoint that the abrasion resistance of the surface layer will be superior.

As compound (3), from such a viewpoint that the initial water contact angle and abrasion resistance of the surface layer will be superior, compound (3-11), compound (3-21) and compound (3-31) are preferred. Among them, compound (3-11) and compound (3-21) are particularly excellent in the initial water contact angle of the surface layer, and compound (3-31) is particularly excellent in the abrasion resistance of the surface layer.

$$R^{f1}—(OX)_m—O—Y^{11}[—Si(R)_nL_{3-n}]_{g1} \quad (3\text{-}11)$$

$$[R^{f2}—(OX)_m—O—]_{j2}Y^{21}[—Si(R)_nL_{3-n}]_{g2} \quad (3\text{-}21)$$

$$[L_{3-n}(R)_nSi\text{-}]_{k3}Y^{32}—(OX)_m—O—Y^{31}[—Si(R)_nL_{3-n}]_{g3} \quad (3\text{-}31)$$

In the formula (3-11), X, m, R, n and L are, respectively, synonymous with the definitions of X, m, R, n and L in the formula (3).

$R^{f1}$ is a perfluoroalkyl group, and suitable forms and specific examples of the perfluoroalkyl group are as described above.

$Y^{11}$ is a (g1+1)-valent linking group, specific examples of which are the same as Z in the formula (3).

g1 is an integer of 1 or more, preferably an integer of from 2 and 15, more preferably an integer of from 2 to 4, further preferably 2 or 3, particularly preferably 3, from such a viewpoint that the abrasion resistance of the surface layer will be superior.

In the formula (3-21), X, m, R, n and L are, respectively, synonymous with the definitions of X, m, R, n and L in the formula (3).

$R^{f2}$ is a perfluoroalkyl group, and suitable forms and specific examples of the perfluoroalkyl group are as described above.

j2 is an integer of 2 or more, preferably an integer of from 2 to 6, more preferably from 2 to 4.

$Y^{21}$ is a (j2+g2)-valent linking group, specific examples of which are the same as Z in the formula (3).

g2 is an integer of 1 or more, preferably an integer of from 2 to 15, more preferably from 2 to 6, further preferably from 2 to 4, particularly preferably 4, from such a viewpoint that the abrasion resistance of the surface layer will be superior.

In the formula (3-31), X, m, R, n and L are, respectively, synonymous with the definitions of X, m, R, n and L in the formula (3).

k3 is an integer of 1 or more, preferably an integer of from 1 to 4, more preferably 2 or 3, particularly preferably 3.

$Y^{32}$ is a (k3+1)-valent linking group, examples of which are the same as Q in the formula (3).

$Y^{31}$ is a (g3+1)-valent linking group, examples of which are the same as Z in the formula (3).

g3 is an integer of 1 or more, preferably an integer of from 1 to 4, more preferably 2 or 3, particularly preferably 3.

$Y^{11}$ in the formula (3-11) may be group (g2-1) (where d1+d3=1 (i.e. d1 or d3 is 0), g1=d2+d4, d2+d4≥1), group (g2-2) (where e1=1, g1=e2, e2≥1), group (g2-3) (where g1=2), group (g2-4) (where h1=1, g1=h2, h2≥1), group (g2-5) (where i1=1, g1=i2, i2≥1), group (g2-6) (where g1=1), group (g2-7) (where g1=i3+1), group (g2-8) (where g1=i4, i 4≥1) or group (g2-9) (where g1=i5, i5, i5≥1).

$Y^{21}$ in the formula (3-21) may be group (g2-1) (where j2=d1+d3, d1+d3≥2, g2=d2+d4, d2+d4≥1), group (g2-2) (where j2=e1, e1=2, g2=e2, e2≥1), group (g2-4) (where j2=h1, h1≥2, g2=h2, h2≥1) or group (g2-5) (where j2=i1, i1=2, g2=i2, i2≥1).

Further, $Y^{31}$ and $Y^{32}$ in the formula (3-31) may be each independently group (g2-1) (where g3=d2+d4, k3=d2+d4), group (g2-2) (where g3=e2, k3=e2), group (g2-3) (where g3=2, k3=2), group (g2-4) (where g3=h2, k3=h2), group (g2-5) (where g3=i2, k3=i2), group (g2-6) (where g3=1, k3=1), group (g2-7) (where g3=i3+1, k3=i3+1), group (g2-8) (where g3=i4, k3=i4) or group (g2-9) (where g3=i5, k3=i5).

(g 2-1)

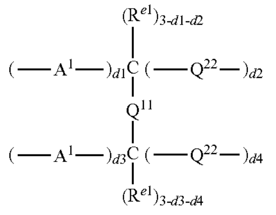

$(-A^1-)_{e1}C(R^{e2})_{4-e1-e2}(-Q^{22}-)_{e2}$ (g2-2)

$-A^1-N(-Q^{23}-)_2$ Formula (g2-3)

$(-A^1-)_{h1}Z^1(-Q^{24}-)_{h2}$ Formula (g2-4)

$(-A^1-)_{i1}Si(R^{e3})_{4-i1-i2}(-Q^{25}-)_{i2}$ (g2-5)

$-A^1-Q^{26}-$ Formula (g2-6)

$-A^1-CH(-Q^{22}-)—Si(R^{e3})_{3-i3}(-Q^{25}-)_{i3}$ (g2-7)

$-A^1-[CH_2C(R^{e4})(-Q^{27}-)]_{i4}-R^{e5}$ (g2-8)

$-A^1-Z^a(-Q^{28}-)_{i5}$ (g2-9)

Here, in the formula (g2-1) to the formula (g2-9), $A^1$ is connected to the $(OX)_m$ side, $Q^{22}$, $Q^{23}$, $Q^{24}$, $Q^{25}$, $Q^{26}$, $Q^{27}$ and $Q^{28}$ are connected to the $[—Si(R)_nL_{3-n}]$ side.

$A^1$ is a single bond, an alkylene group, or a group having $—C(O)NR^6—$, —C(O)—, —OC(O)O—, —NHC(O)O—, $—NHC(O)NR^6—$, —O—, $—SO_2NR^6—$ or $—N(R^6)SO_2—$ between carbon-carbon atoms in an alkylene group with two or more carbon atoms, and in each formula, if two or more $A^1$ are present, the two or more $A^1$ may be the same or different. The hydrogen atom in the alkylene group may be replaced by a fluorine atom.

$Q^{11}$ is a single bond, —O—, an alkylene group, or a group having $—C(O)NR^6—$, —C(O)—, $—NR^6—$ or —O— between carbon-carbon atoms in an alkylene group with two or more carbon atoms.

$Q^{22}$ is an alkylene group, a group having $—C(O)NR^6—$, —C(O)—, $—NR^6—$ or —O— between carbon-carbon atoms in an alkylene group with two or more carbon atoms, a group having $—C(O)NR^6—$, —C(O)—, $—NR^6—$ or —O— at the terminal on the side not connected to Si of an alkylene group, or a group having $—C(O)NR^6—$, —C(O)—, $—NR^6—$ or —O— between carbon-carbon atoms in an alkylene group with two or more carbon atoms and having $—C(O)NR^6—$, —C(O)—, $—NR^6—$ or —O— at the terminal on the side not connected to Si, and in each formula, if two or more $Q^{22}$ are present, the two or more $Q^{22}$ may be the same or different.

$Q^{23}$ is an alkylene group or a group having $—C(O)NR^6—$, —C(O)—, $—NR^6—$ or —O-between carbon-carbon atoms in an alkylene group with two or more carbon atoms, and two $Q^{23}$ may be the same or different.

$Q^{24}$ is $Q^{22}$ if the atom at $Z^1$ to which $Q^{24}$ is bonded is a carbon atom, and $Q^{23}$ if the atom at $Z^1$ to which $Q^{24}$ is bonded is a nitrogen atom, and in each formula, if two or more $Q^{24}$ are present, the two or more $Q^{24}$ may be the same or different.

$Q^{25}$ is an alkylene group, or a group having $—C(O)NR^6—$, —C(O)—, $—NR^6—$ or —O-between carbon-carbon atoms in an alkylene group with two or more carbon atoms, and in each formula, if two or more $Q^{25}$ are present, the two or more $Q^{25}$ may be the same or different.

$Q^{26}$ is an alkylene group, or a group having $—C(O)NR^6—$, —C(O)—, $—NR^6—$ or between carbon-carbon atoms in an alkylene group with two or more carbon atoms.

$R^6$ is a hydrogen atom, a $C_{1-6}$ alkyl group or a phenyl group.

$Q^{27}$ is a single bond or an alkylene group.

$Q^{28}$ is an alkylene group, or a group having an etheric oxygen atom or a divalent organopolysiloxane residue between carbon-carbon atoms in an alkylene group with two or more carbon atoms.

$Z^1$ is a group having a (h1+h2)-valent ring structure which has a carbon atom or a nitrogen atom to which $A^1$ is directly bonded and has a carbon atom or a nitrogen atom to which $Q^{24}$ is directly bonded.

$R^{e1}$ is a hydrogen atom or an alkyl group, and in each formula, if two or more $R^{e1}$ are present, the two or more $R^{e1}$ may be the same or different.

$R^{e2}$ is a hydrogen atom, a hydroxy group, an alkyl group or an acyloxy group.

$R^{e3}$ is an alkyl group.

$R^{e4}$ is a hydrogen atom or an alkyl group, and from such a viewpoint that the compound can easily be produced, a hydrogen atom is preferred. In each formula, if two or more $R^{e4}$ are present, the two or more $R^{e4}$ may be the same or different.

$R^{e5}$ is a hydrogen atom or a halogen atom, and from such a viewpoint that the compound can easily be produced, a hydrogen atom is preferred.

d1 is an integer of from 0 to 3, preferably 1 or 2. d2 is an integer of from 0 to 3, preferably 1 or 2. d1+d2 is an integer of from 1 to 3.

d3 is an integer of from 0 to 3, preferably 0 or 1. d4 is an integer of from 0 to 3, preferably 2 or 3. d3+d4 is an integer of from 1 to 3.

d1+d3 is, in $Y^{21}$, an integer of from 1 to 5, preferably 1 or 2, and, in $Y^{11}$, $Y^{31}$ and $Y^{32}$, 1.

d2+d4 is, in $Y^{11}$ or $Y^{21}$, an integer of from 1 to 5, preferably 4 or 5 and, in $Y^{31}$ and $Y^{32}$, an integer of from 1 to 5, preferably an integer of from 3 to 5, particularly preferably 4 or 5.

e1+e2 is 3 or 4. e1 is, in $Y^{11}$, 1, in $Y^{21}$, an integer of from 2 to 3, and, in $Y^{31}$ and $Y^{32}$, 1. e2 is, in $Y^{11}$ and $Y^{12}$, an integer of from 1 to 3, preferably 2 or 3, and, in $Y^{31}$ and $Y^{32}$, from 1 to 3, preferably 2 or 3.

h1 is, in $Y^{11}$, 1, in $Y^{21}$, an integer of 2 or more (preferably 2), and, in $Y^{31}$ and $Y^{32}$, 1. h2 is, in $Y^{11}$ or $Y^{21}$, an integer of 1 or more (preferably 2 or 3), and, in $Y^{31}$ and $Y^{32}$, an integer of 1 or more (preferably 2 or 3).

i1+i2 is, in $Y^{11}$, from 2 to 4 (preferably 3 or 4), in $Y^{12}$, 3 or 4 (preferably 4), and, in $Y^{31}$ and $Y^{32}$, an integer of from 2 to 4 (preferably 3 or 4). i1 is, in $Y^{11}$, 1, in $Y^{21}$, 2 or 3, and in $Y^{31}$ and $Y^{32}$, 1. i2 is, in $Y^{11}$, an integer of from 1 to 3 (preferably 2 or 3), in $Y^{12}$, 1 or 2 (preferably 2), and, in $Y^{31}$ and $Y^{32}$, an integer of from 1 to 3 (preferably 2 or 3).

i3 is an integer of from 0 to 3, preferably from 1 to 3, particularly preferably 2 or 3.

i4 is, in $Y^{11}$, 1 or more (preferably an integer of from 2 to 10, particularly preferably an integer of from 2 to 6), and, in $Y^{31}$ and $Y^{32}$, 1 or more (preferably an integer of from 1 to 10, particularly preferably an integer of from 1 to 6).

i5 is, in $Y^{11}$, 1 or more (preferably an integer of from 2 to 7), and, in $Y^{31}$ and $Y^{32}$, 1 or more (preferably an integer of from 2 to 7).

The number of carbon atoms in the alkylene group for $Q^{22}$, $Q^{23}$, $Q^{24}$, $Q^{25}$, $Q^{26}$, $Q^{27}$ and $Q^{28}$ is preferably from 1 to 10, more preferably from 1 to 6, particularly preferably from 1 to 4, from such a viewpoint that compound (3-11), compound (3-21) and compound (3-31) can easily be produced, and from such a viewpoint that the abrasion resistance, light resistance and chemical resistance of the surface layer will be superior. However, the lower limit value of the number of carbon atoms in the alkylene group in the case of having a specific bond between carbon-carbon atoms is 2.

As the ring structure in $Z^1$, the above-described ring structure may be mentioned, and the preferred form is also the same. Since $A^1$ and $Q^{24}$ are directly bonded to the ring structure in $Z^1$, there will be no such a possibility that, for example, an alkylene group is linked to the ring structure and $A^1$ and $Q^{24}$ are linked to that alkylene group.

$Z^a$ is a (i5+1)-valent organopolysiloxane residue, and the following groups are preferred. Here, $R^a$ in the following formulas is an alkyl group (preferably $C_{1-10}$) or a phenyl group.

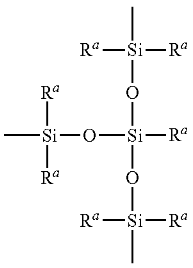

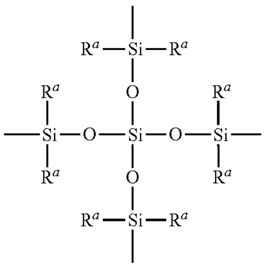

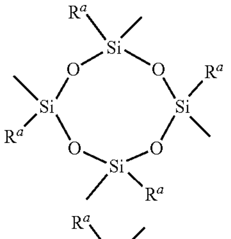

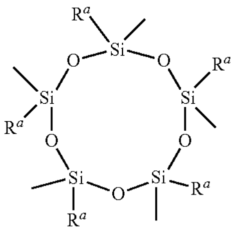

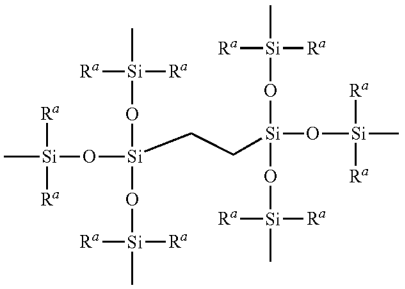

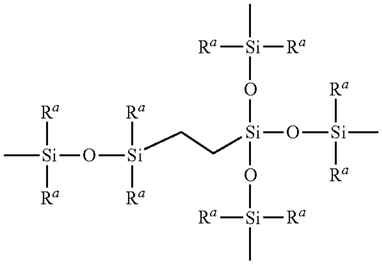

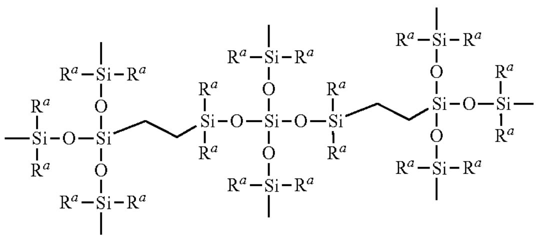

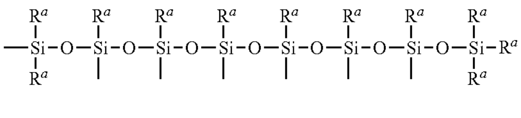

The number of carbon atoms in the alkyl group for $R^{e1}$, $R^{e2}$, $R^{e3}$ or $R^{e4}$ is preferably from 1 to 10, more preferably from 1 to 6, further preferably from 1 to 3, particularly preferably from 1 to 2, from such a viewpoint that compound (3-11), compound (3-21) and compound (3-31) can easily be produced.

The number of carbon atoms in the alkyl group moiety of the acyloxy group for $R^{e2}$ is preferably from 1 to 10, more preferably from 1 to 6, further preferably from 1 to 3, particularly preferably from 1 to 2, from such a viewpoint that compound (3-11), compound (3-21) and compound (3-31) can easily be produced.

h1 is preferably from 1 to 6, more preferably from 1 to 4, further preferably 1 or 2, particularly preferably 1, from such a viewpoint that compound (3-11), compound (3-21) and compound (3-31) can easily be produced and from such a viewpoint that the abrasion resistance and fingerprint stain removability of the surface layer will be superior.

h2 is preferably from 2 to 6, more preferably from 2 to 4, particularly preferably 2 or 3, from such a viewpoint that compound (3-11), compound (3-21) and compound (3-31) can be easily produced, and from such a viewpoint that the abrasion resistance and fingerprint stain removability of the surface layer will be superior.

Other forms of $Y^{11}$ include group (g3-1) (where d1+d3=1 (i.e. d1 or d3 is 0), g1=d2×r1+d4×r1), group (g3-2) (where e1=1, g1=e2×r1), group (g3-3) (where g1=2×r1), group (g3-4) (where h1=1, g1=h2×r1), group (g3-5) (where i1=1, g1=i2×r1), group (g3-6) (where g1=r1), group (g3-7) (where g1=r1×(i3+1)), group (g3-8) (where g1=r1×i4), and group (g3-9) (where g1=r1×i5).

Other forms of $Y^{21}$ include group (g3-1) (where j2=d1+d3, d1+d3≥2, g2=d2×r1+d4×r1), group (g3-2) (where j2=e1, e1=2, g2=e2×r1, e2=2), group (g3-4) (where j2=h1, h1≥2, g2=h2×r1), and group (g3-5) (where j2=i1, i1 is 2 or 3, g2=i2×r1, i1+i2 is 3 or 4).

Other forms of $Y^{31}$ and $Y^{32}$ include group (g3-1) (where g3=d2×r1+d4×r1, k3=d2×r1+d4×r1), group (g3-2) (where g3=e2×r1, k3=e2×r1), group (g3-3) (where g3=2×r1, k3=2×r1), group (g3-4) (where g3=h2×r1, k3=h2×r1), group (g3-5) (where g3=i2×r1, k3=i2×r1), group (g3-6) (where g3=r1, k3=r1), group (g3-7) (where g3=r1×(i3+1), k3=r1×(i3+1)), group (g3-8) (where g3=r1×i4, k3=r1×i4), and group (g3-9) (where g3=r1×i5, k3=r1×i5).

(g 3-1)

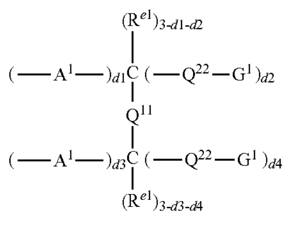

$$(-A^1-)_{e1}C(R^{e2})_{4-e1-e2}(-Q^{22}-G^1)_{e2} \quad (g3\text{-}2)$$

$$-A^1-N(-Q^{23}-G^1)_2 \quad (g3\text{-}3)$$

$$(-A^1-)_{h1}Z^1(-Q^{24}-G^1)_{h2} \quad (g3\text{-}4)$$

$$(-A^1-)_{i1}Si(R^{e3})_{4-i1-i2}(-Q^{25}-G^1)_{i2} \quad (g3\text{-}5)$$

$$-A^1-Q^{26}-G_1 \quad (g3\text{-}6)$$

$$-A^1-CH(Q^{22}-G^1)-Si(R^{e3})_{3-i3}(-Q^{25}-G^1)_{i3} \quad (g3\text{-}7)$$

$$-A^1-[CH_2C(R^{e4})(-Q^{27}-G^1)]_{i4}-R^{e5} \quad (g3\text{-}8)$$

$$-A^1-Z^a(-Q^{28}-G^1)_{i5} \quad (g3\text{-}9)$$

However, in the formula (g3-1) to the formula (g3-9), $A^1$ is connected to the $(OX)_m$ side, and $G^1$ is connected to the $[—Si(R)_nL_{3-n}]$ side.

$G^1$ is group (g3), and in each formula, if there are two or more $G^1$, the two or more $G^1$ may be the same or different. The symbols other than $G^1$ are the same as those in the formula (g2-1) to the formula (g2-9).

$$—Si(R^8)_{3-r1}(-Q^3-)_{r1} \quad (g3)$$

However, in the formula (g3), Si is connected to the $Q^{22}$, $Q^{23}$, $Q^{24}$, $Q^{25}$, $Q^{26}$, $Q^{27}$ and $Q^{28}$ side, and $Q^3$ is connected to the $[—Si(R)_nL_{3-n}]$ side. $R^8$ is an alkyl group. $Q^3$ is an alkylene group, a group having $—C(O)NR^6—$, —C(O)—, $—NR^6—$ or —O— between carbon-carbon atoms in an alkylene group with two or more carbon atoms, or $—(OSi(R^9)_2)_p—O—$, and two or more $Q^3$ may be the same or different. r1 is 2 or 3. $R^6$ is a hydrogen atom, a $C_{1-6}$ alkyl group or a phenyl group, $R^9$ is an alkyl group, a phenyl group or an alkoxy group, and two $R^9$ may be the same or different. p is an integer of from 0 to 5, and if p is 2 or more, the two or more $(OSi(R^9)_2)$ may be the same or different.

The number of carbon atoms in the alkylene group for $Q^3$ is preferably from 1 to 10, more preferably from 1 to 6, particularly preferably from 1 to 4, from such a viewpoint that compound (3-11), compound (3-21) and compound (3-31) can easily be produced, and from such a viewpoint that the abrasion resistance, light resistance and chemical resistance of the surface layer will be superior. However, the lower limit value of the number of carbon atoms in the alkylene group in the case of having a specific bond between carbon-carbon atoms is 2.

The number of carbon atoms in the alkyl group for $R^8$ is preferably from 1 to 10, more preferably from 1 to 6, further preferably from 1 to 3, particularly preferably from 1 to 2, from such a viewpoint that compound (3-11), compound (3-21) and compound (3-31) can easily be produced.

The number of carbon atoms in the alkyl group for $R^9$ is preferably from 1 to 10, more preferably from 1 to 6, further preferably from 1 to 3, particularly preferably from 1 to 2, from such a viewpoint that compound (3-11), compound (3-21) and compound (3-31) can easily be produced.

The number of carbon atoms in the alkoxy group for $R^9$ is preferably from 1 to 10, more preferably from 1 to 6, further preferably from 1 to 3, particularly preferably from 1 to 2, from such a viewpoint that the storage stability of compound (3-11), compound (3-21) and compound (3-31) will be excellent.

p is preferably 0 or 1.

As compound (3-11), compound (3-21) and compound (3-31), for example, compounds of the following formulas may be mentioned. The compounds of the following formulas are preferred from such a viewpoint that they are industrially easy to produce and easy to handle, and the water and oil repellency, abrasion resistance, fingerprint stain removability, lubricity, chemical resistance, light resistance and chemical resistance of the surface layer are superior, and among them, the light resistance is particularly excellent.

$R^f$ in the compounds of the following formulas is $R^{f1}—(OX)_m—O—(CF_2)_n—$ or $R^{f2}—(OX)_m—O—(CF_2)_n—$. Here, $R^{f1}$, $R^{f2}$, X and m are as defined above, and n is an integer of from 0 to 6.

Q' in the compounds of the following formulas is $—(OX)_m—O—(CF_2)_n—$. Here, X and m are as defined above, and n is an integer of from 0 to 6.

As compound (3-11) in which $Y^{11}$ is group (g2-1), for example, a compound of the following formula may be mentioned.
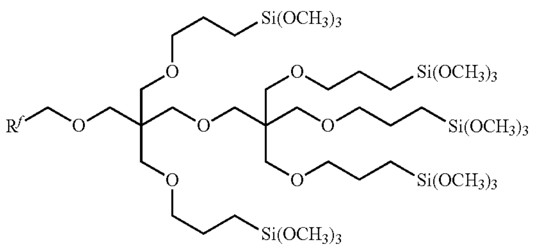
As compound (3-11) in which $Y^{11}$ is group (g2-2), for example, compounds of the following formulas may be mentioned.
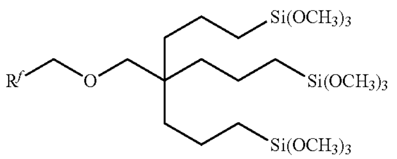
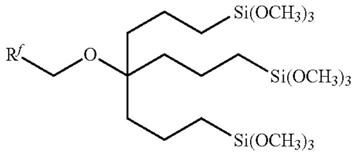
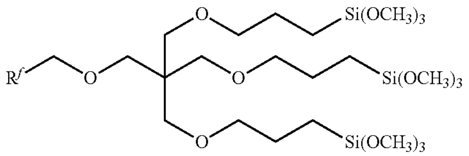
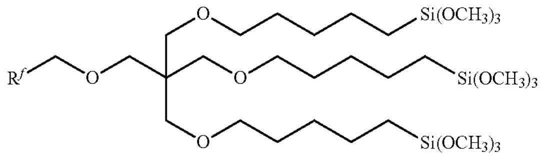
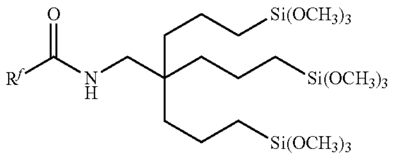
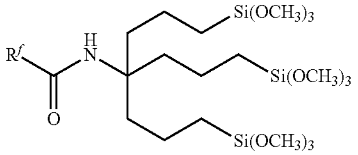
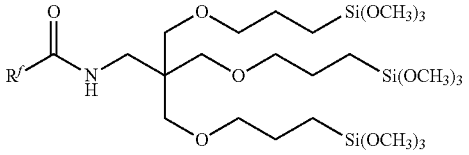
-continued
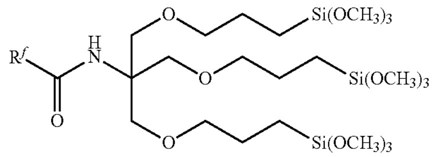
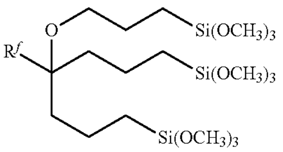
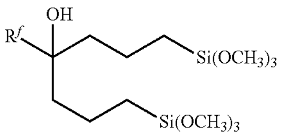
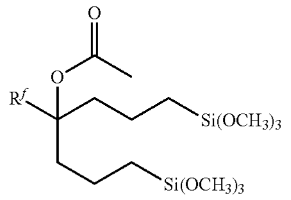
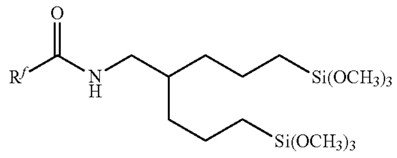
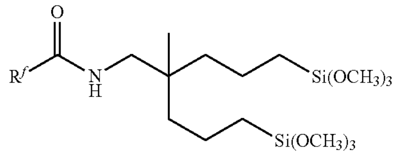
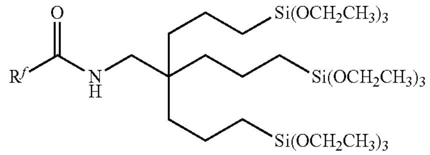
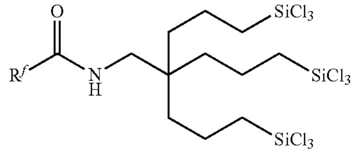
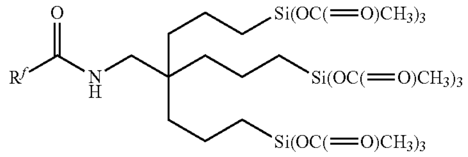
As compound (3-21) in which $Y^{21}$ is group (g2-2), for example, compounds of the following formulas may be mentioned.
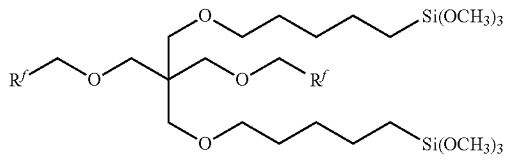

-continued
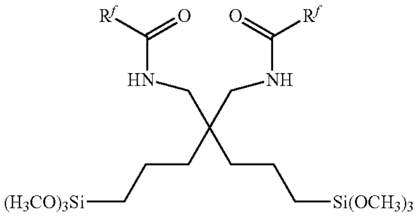
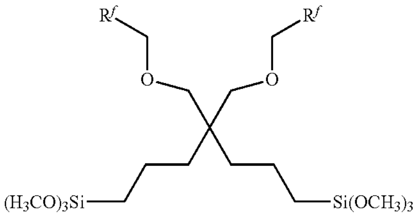
As compound (3-11) in which $Y^{11}$ is group (g2-3), for example, compounds of the following formulas may be mentioned.
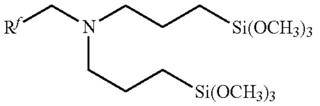
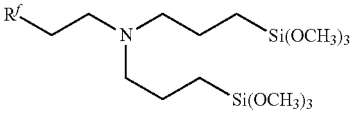
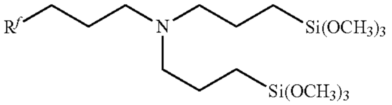
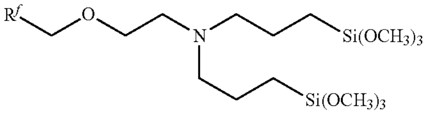
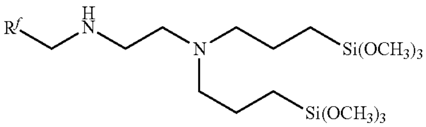
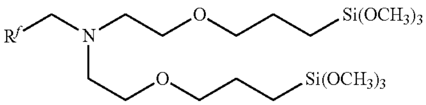
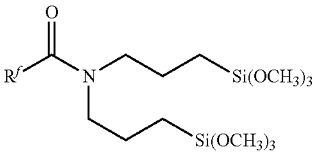
As compound (3-11) in which $Y^{11}$ is group (g2-4), for example, compounds of the following formulas may be mentioned.
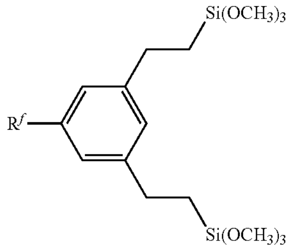
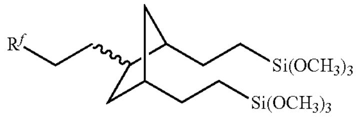
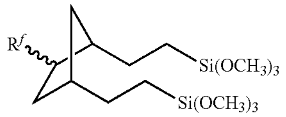
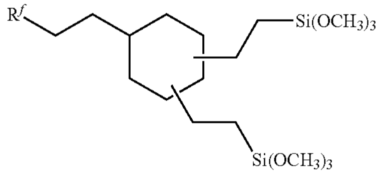
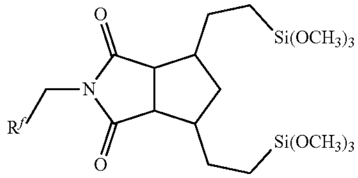
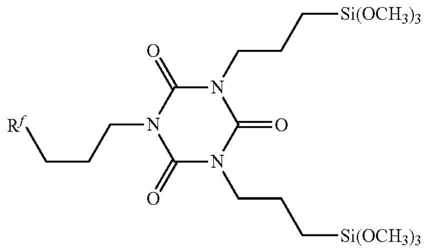
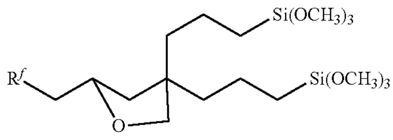
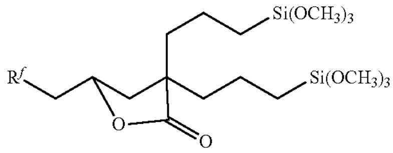
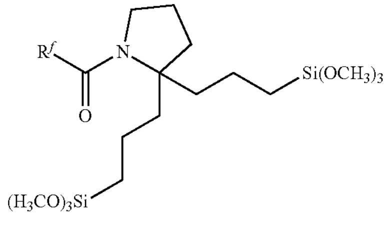

-continued

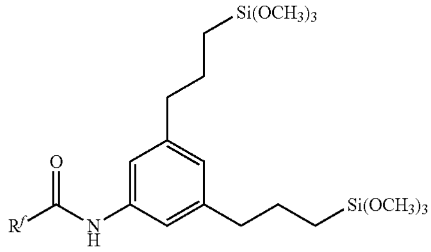

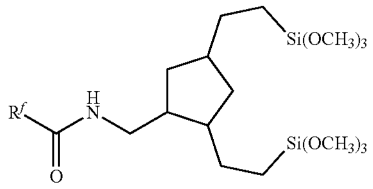

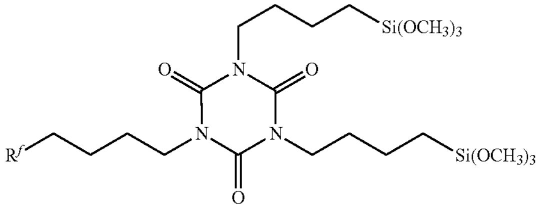

As compound (3-11) in which $Y^{11}$ is group (g2-5), for example, compounds of the following formulas may be mentioned.

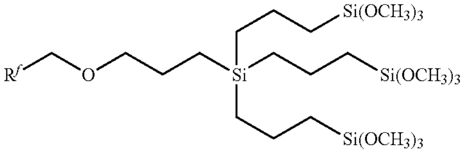

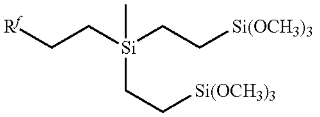

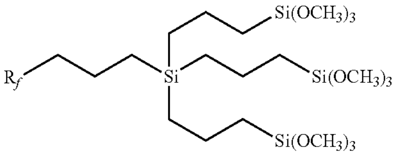

-continued

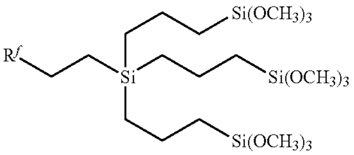

As compound (3-11) in which $Y^{11}$ is group (g2-6), for example, compounds of the following formulas may be mentioned.

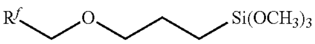

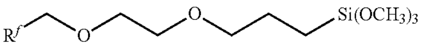

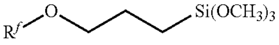

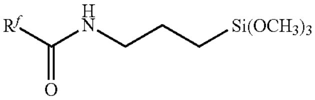

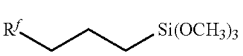

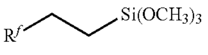

As compound (3-11) in which $Y^{11}$ is group (g2-7), for example, compounds of the following formulas may be mentioned.

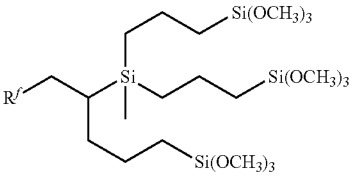

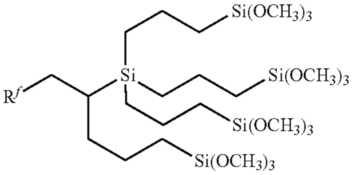

As compound (3-11) in which $Y^{11}$ is group (g3-1), for example, compounds of the following formulas may be mentioned.

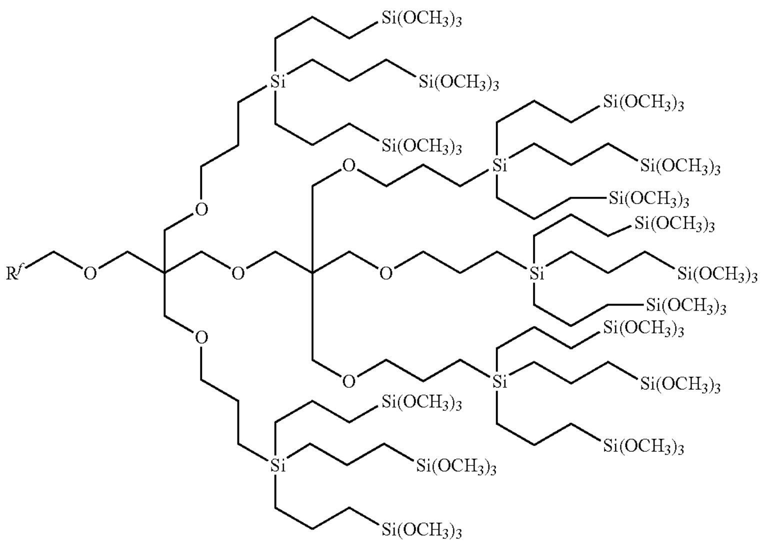
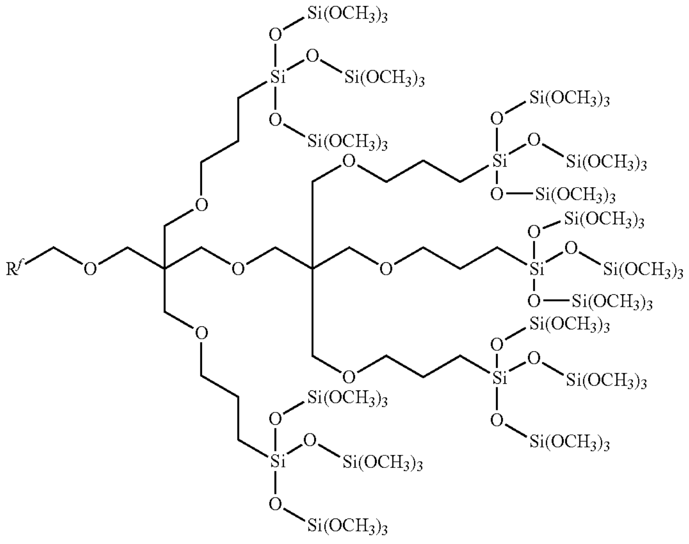

As compound (3-11) in which $Y^{11}$ is group (g3-2), for example, compounds of the following formulas may be mentioned.
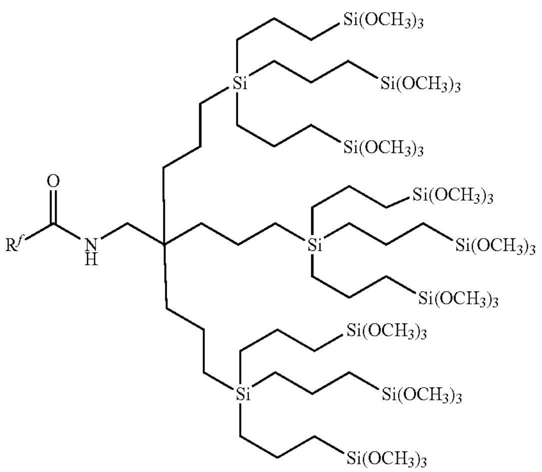
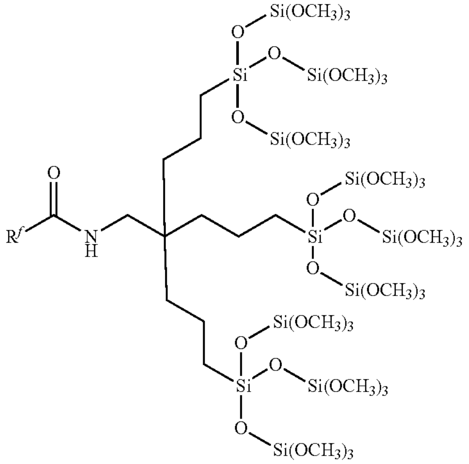
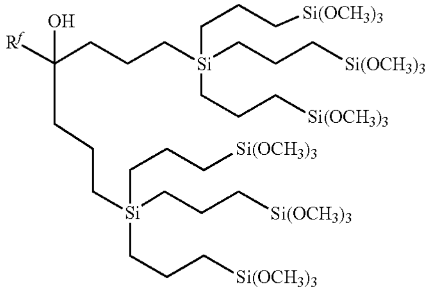
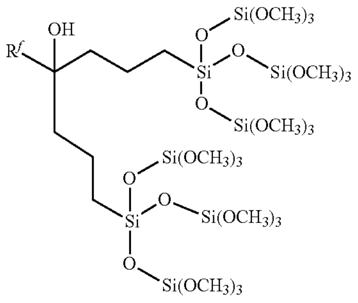
As compound (3-11) in which $Y^{11}$ is group (g3-3), for example, compounds of the following formulas may be mentioned.
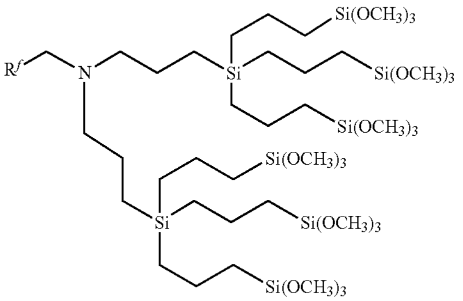
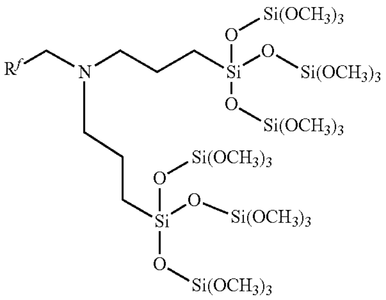
As compound (3-11) in which $Y^{11}$ is group (g3-4), for example, compounds of the following formulas may be mentioned.
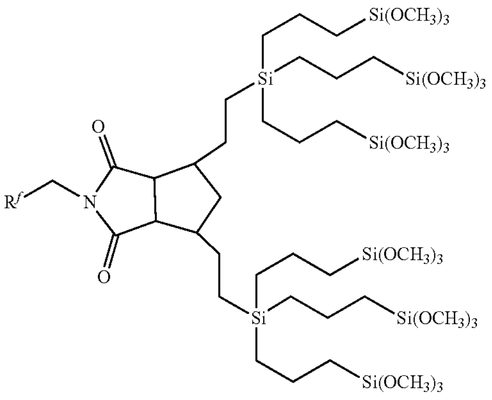
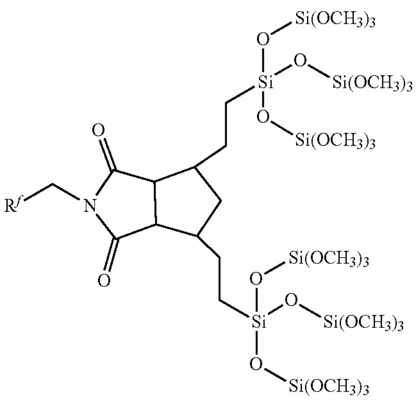

-continued
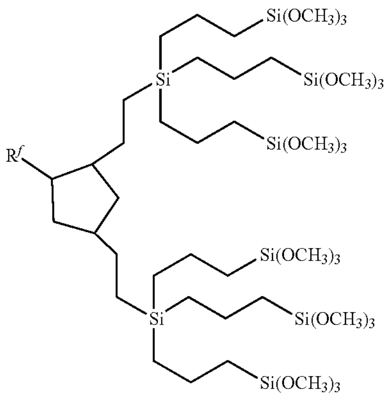
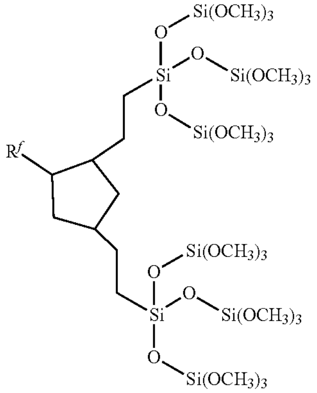
As compound (3-11) in which $Y^{11}$ is group (g3-5), for example, compounds of the following formulas may be mentioned.
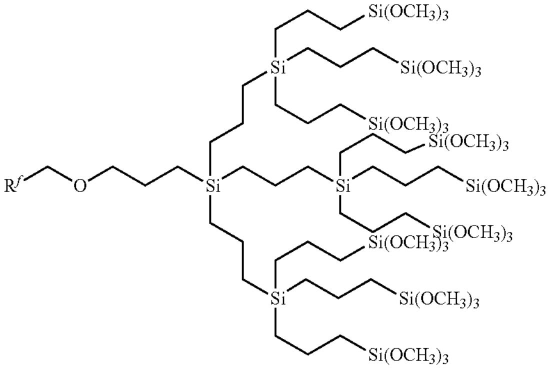
-continued
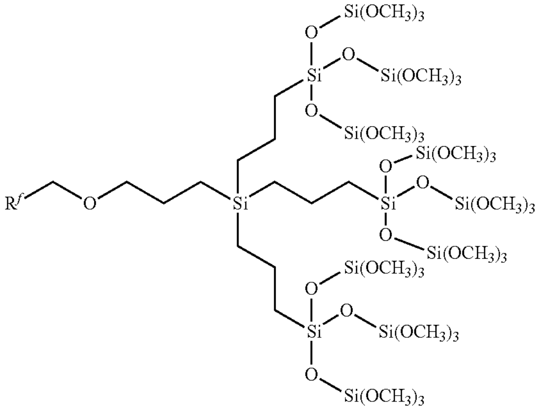
As compound (3-11) in which $Y^{11}$ is group (g3-6), for example, compounds of the following formulas may be mentioned.
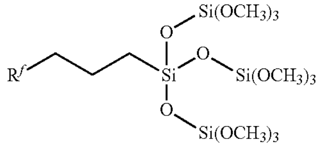
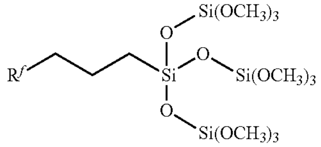
As compound (3-11) in which $Y^{11}$ is group (g3-7), for example, compounds of the following formulas may be mentioned.
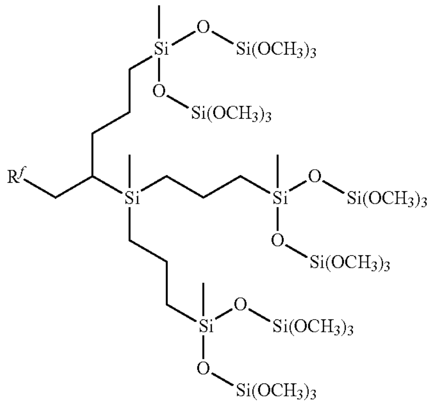

-continued
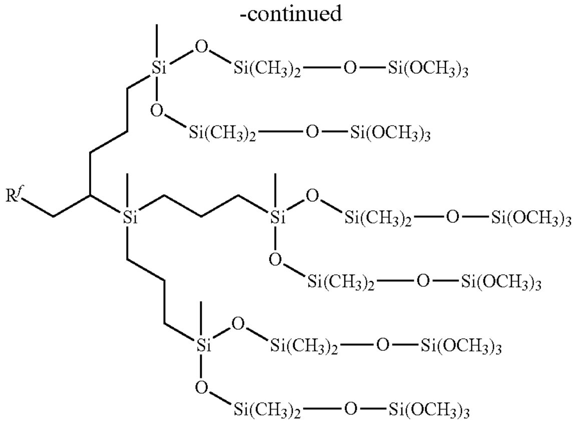
As compound (3-21) in which $Y^{21}$ is group (g2-1), for example, compounds of the following formulas may be mentioned.
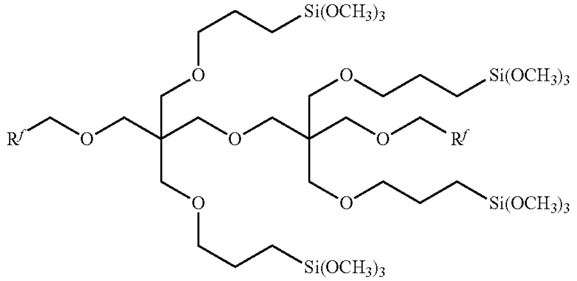
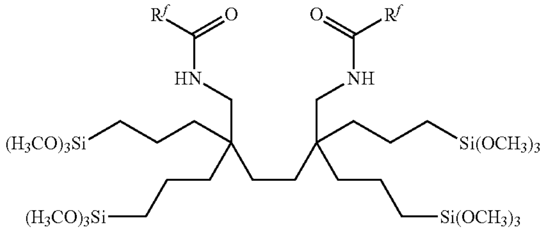
As compound (3-31) in which $Y^{31}$ and $Y^{32}$ are groups (g2-1), for example, a compound of the following formula may be mentioned.
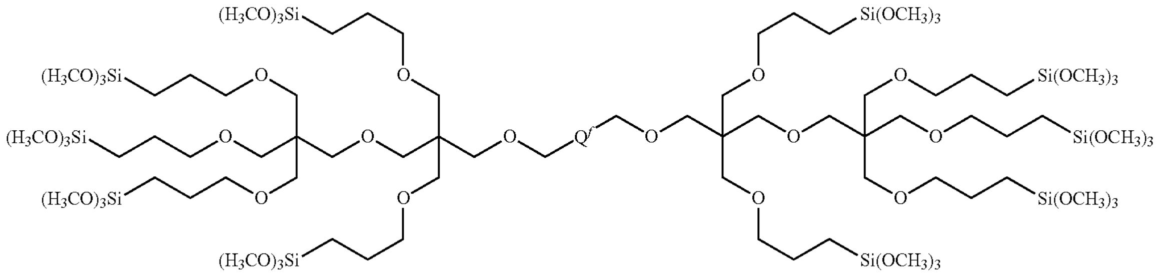

As compound (3-31) in which $Y^{31}$ and $Y^{32}$ are groups (g2-2), for example, compounds of the following formulas may be mentioned.

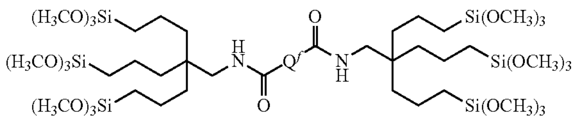

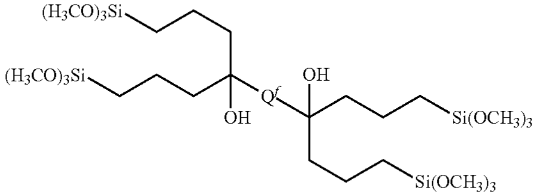

A compound (3-31) in which $Y^{31}$ and $Y^{32}$ are groups (g2-3), for example, a compound of the following formula may be mentioned.

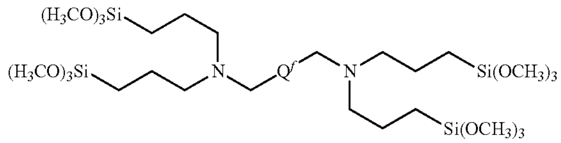

As compound (3-31) in which $Y^{31}$ and $Y^{32}$ are groups (g2-4), for example, a compound of the following formula may be mentioned.

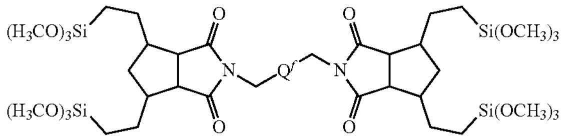

As compound (3-31) in which $Y^{31}$ and $Y^{32}$ are groups (g2-5), for example, a compound of the following formula may be mentioned.

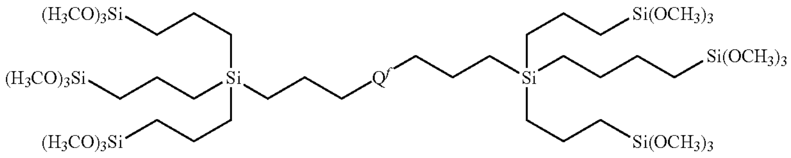

As compound (3-31) in which $Y^{31}$ and $Y^{32}$ are groups (g2-6), for example, a compound of the following formula may be mentioned.
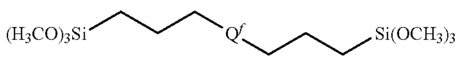
As compound (3-31) in which $Y^{31}$ and $Y^{32}$ are groups (g2-7), for example, a compound of the following formula may be mentioned.
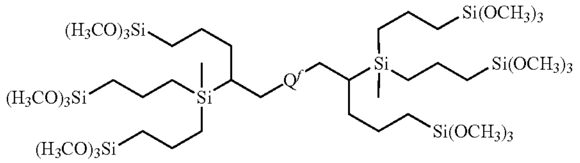
As compound (3-31) in which $Y^{31}$ and $Y^{32}$ are groups (g3-2), for example, compounds of the following formulas may be mentioned.
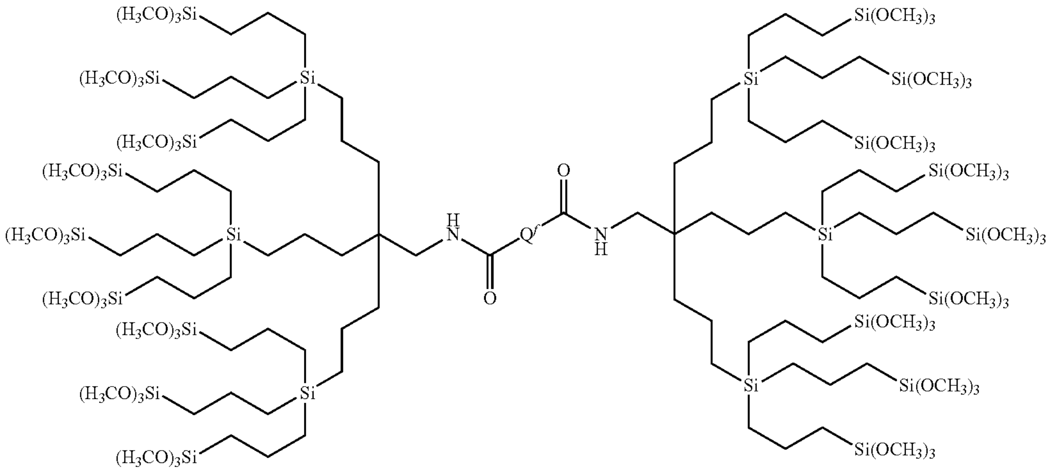
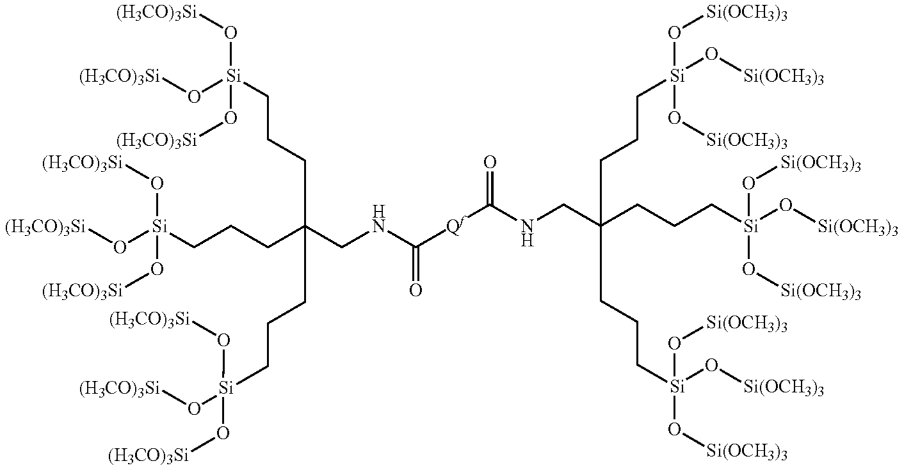

As specific examples of the specific fluorinated ether compound, for example, those listed in the following literature, may be mentioned.

Perfluoropolyether-modified aminosilanes described in JP-A-H11-029585 and JP-A-2000-327772, Silicon-containing organic fluorinated polymers described in Japanese Patent No. 2874715, Organosilicon compounds described in JP-A-2000-144097, Fluorinated siloxanes described in JP-A-2002-506887, Organosilicon compounds described in JP-A-2008-534696, Fluorinated modified hydrogen-containing polymers described in Japanese Patent No. 4138936, The compounds described in U.S. Patent Application Publication No. 2010/0129672, WO2014/126064 and JP-A-2014-070163, Organosilicon compounds described in WO2011/060047 and WO2011/059430, Fluorinated organosilane compounds described in WO2012/064649, Fluorooxyalkylene group-containing polymers described in JP-A-2012-72272, Fluorinated ether compounds described in WO2013/042732, WO2013/121984, WO2013/121985, WO2013/121986, WO2014/163004, JP-A-2014-080473, WO2015/087902, WO2017/038830, WO2017/038832, WO2017/187775, WO2018/216630, WO2019/039186, WO2019/039226, WO2019/039341, WO2019/044479, WO2019/049753, WO2019/163282 and JP-A-2019-044158, Perfluoro(poly)ether-containing silane compounds described in JP-A-2014-218639, WO2017/022437, WO2018/079743, WO2018/143433, Perfluoro(poly)ether group-containing silane compounds described in WO2018/169002, Fluoro(poly)ether group-containing silane compounds described in WO2019/151442, (Poly)ether group-containing silane compounds described in WO2019/151445, Perfluoropolyether group-containing compounds described in WO2019/098230, Fluoropolyether group-containing polymer-modified silanes described in JP-A-2015-199906, JP-A-2016-204656, JP-A-2016-210854, and JP-A-2016-222859, Fluorinated compounds described in WO2019/039083 and WO2019/049754.

Commercially available products of the specific fluorinated ether compound include the KY-100 series (KY-178, KY-185, KY-195, etc.) manufactured by Shin-Etsu Chemical Co., Ltd. Afluid (registered trademark) S550 manufactured by AGC, Inc., Optool (registered trademark) DSX, Optool (registered trademark) AES, Optool (registered trademark) UF503 and Optool (registered trademark) UD509, manufactured by Daikin Industries, Ltd., etc.

As the specific fluorinated ether compound, one type may be used alone, or two or more types may be used in combination.

<Second Component>

The second component contained in the composition of the present invention is at least one type selected from the group consisting of compound (A) and compound (B). The second component may contain both compound (A) and compound (B), or only one of them.

(Compound (A))

Compound (A) is a compound represented by the formula (A).

$$R^{fa}—(OX^a)_{m1}\text{-}L^a\text{-}CZ^{a1}═CH_2 \quad (A)$$

$R^{fa}$ is a $C_{1-20}$ fluoroalkyl group.

The number of carbon atoms in the fluoroalkyl group is preferably from 1 to 10, more preferably from 1 to 6, particularly preferably from 1 to 3, from such a viewpoint that the water repellency of the surface layer will be superior.

The fluoroalkyl group may be linear, branched or cyclic.

As the fluoroalkyl group, a group in which all hydrogen atoms in the fluoroalkyl group are replaced with fluorine atoms (a perfluoroalkyl group) is preferred.

$X^a$ is a $C_{1-6}$ fluoroalkylene group. The suitable form of $X^a$ is the same as X in the above formula (1). Further, the suitable form of $(OX^a)$ is the same as (OX) in the above formula (1).

The number m1 of repetitions of $(OX^a)$ is an integer of 2 or more. The suitable form of m1 is the same as the number m of repetitions of the above (OX).

In a case where the specific fluorinated ether compound is a compound represented by the formula (1), from such a viewpoint that the effect of the present invention will be superior, it is preferred that (OX) in the formula (1) and $(OX^a)$ in the formula (A) are the same group.

$L^a$ is a single bond or a divalent linking group (but excluding $(OX^a)_{na}$ where na is an integer of 1 or more).

Specific examples of the divalent linking group include an alkylene group, an etheric oxygen atom, an amide bond, and a combination of these groups. Among the divalent linking groups, from such a viewpoint that compound (A) can easily be produced, and from the viewpoint of the thermal and chemical stability, an alkylene group, a group having an alkylene group and an etheric oxygen atom combined, and a group having an alkylene group and an amide bond combined, are preferred.

The divalent linking group in $L^a$ does not include $(OX^a)_{na}$. The definition of $(OX^a)$ is as defined above, and na is an integer of 1 or more.

$L^a$ is preferably a single bond, from such a viewpoint that the effect of the present invention will be superior.

$Z^{a1}$ is a fluorine atom or a trifluoromethyl group, preferably a fluorine atom from such a viewpoint that the effect of the present invention will be superior.

As compound (A), two or more types may be used in combination.

Specific examples of compound (A) will be shown below. Here, PFPE in the following compounds is the same as $R^{fa}—(OX^a)^{m1}—$ in the formula (A), and the suitable forms are also the same. n10 in the following compounds represents an integer of from 1 to 10.

$PFPE\text{-}CF═CH_2$ $PFPE\text{-}CH_2—O—(CH_2)_{n10}—CF═CH_2$ $PFPE\text{-}CH_2—(CH_2)_{n10}—CF═CH_2$ $PFPE\text{-}C(O)—NH—(CH_2)_{n10}—CF═CH_2$ The production method for compound (A) is not particularly limited, but, for example, a method of reacting a metal or an organometallic reagent and compound (a1) to let the elimination reaction of compound (a1) be proceeded to obtain compound (A) may be mentioned. Specifically, $Q^{a1}$ in compound (a1) and a fluorine atom in $CFZ^{a1}$ are removed to obtain compound (A).

Compound (a1) is a compound represented by the formula (a1).

$$R^{fa}—(OX^a)_{m1}\text{-}L^a\text{-}CFZ^{a1}—CH_2\text{-}Q^{a1} \quad (a1)$$

In the formula (a1), the definitions of $R^{fa}$, $X^a$, $L^a$, $Z^{a1}$ and m1 are as defined above.

$Q^{a1}$ is a leaving group, and a halogen atom or a sulfonate group ($-O-SO_2-R^{a1}$) is preferred. $R^{a1}$ is an organic group.

Specific examples of the halogen atom in the leaving group include a fluorine atom, a chlorine atom, a bromine atom and an iodine atom, and a chlorine atom, a bromine atom or an iodine atom is preferred.

Specific examples of the sulfonate group in the leaving group include a tosylate group (OTs), a mesylate group (OMs), a triflate group (OTf) and a nonaflate group (ONf), and a triflate group is preferred.

Specific examples of the metal include metals such as magnesium, copper, iron, zinc, tin, antimony, etc., and alloys of these metals with cadmium, palladium or mercury. As the metal, one type may be used alone, or two or more types may be used in combination.

Specific examples of the organometallic reagent include an organolithium compound, a Grignard reagent and an organocopper compound. As the organometallic reagent, one type may be used alone, or two or more types may be used in combination.

The amount of the metal to be used is preferably from 1 to 30 moles per mole of compound (a1).

The above-mentioned elimination reaction is preferably carried out in the presence of an organic solvent from such a viewpoint that the yield of compound (A) will be excellent, and particularly preferably carried out in the presence of a fluorinated organic solvent.

Specific examples of the fluorinated organic solvent include a fluorinated alkane, a fluorinated aromatic compound, a fluoroalkyl ether, a fluorinated alkyl amine and a fluoroalcohol.

The fluorinated alkane is preferably a $C_{4-8}$ compound, and, for example, $C_6F_{13}H$ (AC-2000: product name, manufactured by AGC, Inc.), $C_6F_{13}C_2H_5$ (AC-6000: product name, manufactured by AGC, Inc.) and $C_2F_5CHFCHFCF_3$ (Vertrel: product name, manufactured by DuPont) may be mentioned.

Specific examples of the fluorinated aromatic compound include hexafluorobenzene, trifluoromethylbenzene, perfluorotoluene, 1,3-bis(trifluoromethyl)benzene and 1,4-bis(trifluoromethyl)benzene.

The fluoroalkyl ether is preferably a $C_{4-12}$ compound, and, for example, $CF_3CH_2OCF_2CF_2H$ (AE-3000: product name, manufactured by AGC, Inc.), $C_4F_3OCH_3$ (Novec-7100: product name, manufactured by 3M), $C_4F_3OC_2H_5$ (Novec-7200: product name, manufactured by 3M) and $C_2F_5CF(OCH_3)C_3F_7$ (Novec-7300: product name, manufactured by 3M) may be mentioned.

Specific examples of the fluorinated alkyl amine include perfluorotripropylamine and perfluorotributylamine.

Specific examples of the fluoroalcohol include 2,2,3,3-tetrafluoropropanol, 2,2,2-trifluoroethanol and hexafluoroisopropanol.

In a case where a fluorinated organic solvent is used, the amount of its use is preferably from 50 to 500 parts by mass to 100 parts by mass of compound (a1).

The reaction temperature is not particularly limited, but is usually from 0 to 100° C.

The reaction may be carried out under atmospheric pressure or under pressure. When the reaction is carried out under pressure, the reaction pressure can be made to be from 0.2 MPa to 1 MPa.

Compound (A) can also be produced by methods other than using compound (a1) as described above.

For example, in a case where compound (A) is compound (A1) (a compound in which $L^a$ of the formula (A) contains an etheric oxygen atom), then compound (A1) can be obtained by a reaction of compound (a2-1) and compound (a2-2).

$$R^{fa}-(OX^a)_{m1}-L^{a11}-OH \quad (a2\text{-}1)$$

$$Q^{a11}-L^{a12}-CZ^{a1}=CH_2 \quad (a2\text{-}2)$$

$$R^{fa}-(OX^a)_{m1}-L^{a11}-O-L^{a12}-CZ^{a1}=CH_2 \quad (A1)$$

In the formula (a2-1), the definitions of $R^{fa}$, $X^a$ and m1 are as defined above, and $L^{a11}$ is a divalent linking group.

In the formula (a2-2), $Z^{a1}$ is as defined above, $Q^{a11}$ is a halogen atom or a sulfonate group, and $L^{a12}$ is a divalent linking group.

In the formula (A1), the definitions of $R^{fa}$, $X^a$, $Z^{a1}$, $L^{a11}$, $L^{a12}$ and m1 are as defined above. $-L^{a11}-O-L^{a12}-$ in compound (A1) corresponds to $L^{a1}$ in compound (A).

Further, in a case where compound (A) is compound (A2) (a compound in which $L^a$ in the formula (A) is an alkylene group), compound (A2) can be obtained by a coupling reaction of compound (a3-1) and compound (a3-2) as a Grignard reagent.

$$R^{fa}-(OX^a)_{m1}-L^{a13}-Q^{a13} \quad (a3\text{-}1)$$

$$Q^{a14}Mg-L^{a14}-CZ^{a1}=CH_2 \quad (a3\text{-}2)$$

$$R^{fa}-(OX^a)_{m1}-L^{a13}-L^{a14}-CZ^{a1}=CH_2 \quad (A2)$$

In the formula (a3-1), the definitions of $R^{fa}$, $X^a$ and m1 are as defined above, $L^{a13}$ is an alkylene group, and $Q^{a13}$ is a halogen atom or a sulfonate group.

In the formula (a3-2), the definition of $Z^{a1}$ is as defined above, $L^{a14}$ is an alkylene group, and $Q^{a14}$ is a halogen atom.

In the formula (A2), the definitions of $R^{fa}$, $X^a$, $Z^{a1}$, $L^{a13}$, $L^{a14}$ and m1 are as defined above.

$-L^{a13}-L^{a14}-$ in compound (A2) corresponds to $L^{a1}$ in compound (A).

Further, in a case where compound (A) is compound (A3) (a compound in which $L^a$ in the formula (A) contains an amide bond), compound (A3) can be obtained by a substitution reaction of compound (a4-1) and compound (a4-2).

$$R^{fa}-(OX^a)_{m1}-L^{a15}-C(O)O-Q^{a15} \quad (a4\text{-}1)$$

$$NH_2-L^{a16}-CZ^{a1}=CH_2 \quad (a4\text{-}2)$$

$$R^{fa}-(OX^a)_{m1}-L^{a15}-C(O)-NH-L^{a16}-CZ^{a1}=CH_2 \quad (A3)$$

In the formula (a4-1), the definitions of $R^{fa}$, $X^a$ and m1 are as defined above, $L^{a15}$ is a divalent linking group, and $Q^{a16}$ is an alkyl group.

In the formula (a4-2), $Z^{a1}$ is as defined above, and $L^{a16}$ is a divalent linking group.

In the formula (A3), the definitions of $R^{fa}$, $X^a$, $Z^{a1}$, $L^{a15}$, $L^{a16}$ and m1 are as defined above.

$-L^{a15}-C(O)-NH-L^{a16}-$ in compound (A3) corresponds to $L^{a1}$ in compound (A).

(Compound (B))

Compound (B) is a compound represented by the formula (B).

$$CH_2=CZ^{b2}-L^{b2}-(OX^b)_{m2}-L^{b1}-CZ^{b1}=CH_2 \quad (B)$$

In the formula (B), $X^b$ is a $C_{1-6}$ fluoroalkylene group. Suitable forms of $X^b$ are the same as X in the above formula (1). Further, suitable forms of $(OX^b)$ are the same as (OX) in the above formula (1).

The number m2 of repetitions of $(OX^b)$ is an integer of 2 or more. Suitable forms of m2 are the same as the number m of repetitions of the above (OX).

In a case where the specific fluorinated ether compound is a compound represented by the formula (1), from such a viewpoint that the effect of the present invention will be superior, it is preferred that (OX) in the formula (1) and ($OX^b$) in the formula (B) are the same group.

$L^{b1}$ and $L^{b2}$ are each independently a single bond or a divalent linking group (but excluding $(OX^b)_{nb}$ where nb is an integer of 1 or more).

Specific examples of the divalent linking group include an alkylene group, an etheric oxygen atom, an amide bond and a combination of these groups. Among the divalent linking groups, from such a viewpoint that compound (B) can easily be produced, and from the viewpoint of the thermal and chemical stability, an alkylene group, a group having an alkylene group and an etheric oxygen atom combined, and a group having an alkylene group and an amide bond combined, are preferred.

The divalent linking group in $L^{b1}$ and $L^{b2}$ does not include $(OX^b)_{nb}$. The definition of ($OX^b$) is as defined above, and nb is an integer of 1 or more.

$L^{b1}$ and $L^{b2}$ may be the same or different.

$L^{b2}$ is preferably a single bond from such a viewpoint that the effect of the present invention will be superior.

$Z^{b1}$ and $Z^{b2}$ are each independently a fluorine atom or a trifluoromethyl group.

$Z^{b1}$ and $Z^{b2}$ may be the same or different, but from such a viewpoint that the production will be easier, it is preferred that they are the same.

$Z^{b1}$ and $Z^{b2}$ are both preferably fluorine atoms from such a viewpoint that that the effect of the invention will be superior.

As compound (B), two or more types may be used in combination.

Specific examples of compound (B) are shown below. Here, PFPE in the following compounds is the same as $—(OX^b)_{m2}—$ in the formula (B), and suitable forms are also the same. n11 and n12 in the following compounds each independently represent an integer of from 1 to 10.

$CH_2{=}CF—PFPE\text{-}CF{=}CH_2$ $CH_2{=}CF—(CH_2)_{n11}—O—CH_2—PFPE\text{-}CH_2—O—(CH_2)_{n12}—CF{=}CH_2$ $CH_2{=}CF—(CH_2)_{n11}—CH_2—PFPE\text{-}CH_2—(CH_2)_{n12}—CF{=}CH_2$ $CH_2{=}CF—(CH_2)_{n11}—NH—C(O)—PFPE\text{-}C(O)—NH—(CH_2)_{n12}—CF{=}CH_2$ The production method for compound (B) is not particularly limited, but, for example, a method of reacting a metal or an organometallic reagent and compound (b1) to let the elimination reaction of compound (b1) be proceeded to obtain compound (B) may be mentioned. Specifically, $Q^{b1}$ in compound (b1), a fluorine atom in $CFZ^{b1}$ and a fluorine atom in $Q^{b2}$ and $CFZ^{b2}$ are removed to obtain compound (B). The production method for compound (B) is the same as that for compound (A) using compound (a1), except that compound (b1) is used, and therefore, its description is omitted.

Compound (b1) is a compound represented by the formula (b1).

$$Q^{b2}\text{-}CH_2—CFZ^{b2}\text{-}L^{b2}\text{-}(OX^b)_{m2}\text{-}L^{b1}\text{-}CFZ^{b1}\text{-}CH_2\text{-}Q^{b1} \quad (b1)$$

In the formula (b1), the definitions of $X^b$, $L^{b1}$, $L^{b2}$, $Z^{b1}$, $Z^{b2}$ and m2 are as defined above.

$Q^{b1}$ and $Q^{b2}$ are each independently a leaving group, and a halogen atom or a sulfonate group ($—O—SO_2\text{-}R^{b1}$) is preferred. $R^{b1}$ is an organic group. Specific examples and suitable forms of the halogen atom and the sulfonate group are the same as $Q^{a1}$ in the formula (a1).

Compound (B) can be produced also by methods other than using compound (b1) as described above.

For example, in a case where compound (B) is compound (B1) (a compound in which $L^{b1}$ and $L^{b2}$ of the formula (B) contain etheric oxygen atoms), compound (B1) can be obtained by a reaction of compound (b2-1) and compound (b2-2).

$$HO\text{-}L^{b12}\text{-}(OX^b)_{m2}\text{-}L^{b11}\text{-}OH \quad (b2\text{-}1)$$

$$Q^{b11}\text{-}L^{b13}\text{-}CZ^{b10}{=}CH_2 \quad (b2\text{-}2)$$

$$CH_2{=}CZ^{b10}\text{-}L^{b13}\text{-}O\text{-}L^{b12}\text{-}(OX^b)_{m2}\text{-}L^{b11}\text{-}O\text{-}L^{b13}\text{-}CZ^{b10}{=}CH_2 \quad (B1)$$

In the formula (b2-1), the definitions of $X^b$ and m2 are as defined above, and $L^{b11}$ and $L^{b12}$ are each independently a divalent linking group.

In the formula (b2-2), the definition of $Z^{b10}$ is the same as the above-described $Z^{b1}$ and $Z^{b2}$, $Q^{b11}$ is a halogen atom or a sulfonate group, and $L^{b13}$ is a divalent linking group.

In the formula (B1), the definitions of $X^b$, $Z^{b10}$, $L^{b11}$, $L^{b12}$, $L^{b13}$ and m2 are as defined above. $\text{-}L^{b11}\text{-}O\text{-}L^{b13}\text{-}$ in compound (B1) corresponds to $L^{b1}$ in compound (B), and $\text{-}L^{b13}\text{-}O\text{-}L^{b12}$ in compound (B1) corresponds to $L^{b2}$ in compound (B).

Further, in a case where compound (B) is compound (B2) (a compound in which $L^{b1}$ and $L^{b2}$ in the formula (B) are alkylene groups), compound (B2) can be obtained by a coupling reaction of compound (b3-1) and compound (b3-2) as a Grignard reagent.

$$Q^{b13}\text{-}L^{b15}\text{-}(OX^b)_{m2}\text{-}L^{b14}\text{-}Q^{b12} \quad (b3\text{-}1)$$

$$Q^{b14}Mg\text{-}L^{b16}\text{-}CZ^{b11}{=}CH_2 \quad (b3\text{-}2)$$

$$CH_2{=}CZ^{b11}\text{-}L^{b16}\text{-}L^{b15}\text{-}(OX^b)_{m2}\text{-}L^{b14}\text{-}L^{b16}\text{-}CZ^{b11}{=}CH_2 \quad (B2)$$

In the formula (b3-1), the definitions of $X^b$ and m2 are as defined above, $L^{b14}$ and $L^{b15}$ are each independently an alkylene group, and $Q^{b12}$ and $Q^{b13}$ are each independently a halogen atom or a sulfonate group.

In the formula (b3-2), the definition of $Z^{b11}$ is the same as the above described $Z^{b1}$ and $Z^{b2}$, $L^{b16}$ is an alkylene group, and $Q^{b14}$ is a halogen atom.

In the formula (B2), the definitions of $X^b$, $Z^{b11}$, $L^{b14}$, $L^{b15}$, $L^{b16}$ and m2 are as defined above. $\text{-}L^{b14}\text{-}L^{b16}\text{-}$ in compound (B2) corresponds to $L^{b1}$ in compound (B), and $\text{-}L^{b16}\text{-}L^{b15}\text{-}$ in compound (B2) corresponds to $L^{b2}$ in compound (B).

Further, in a case where compound (B) is compound (B3) (a compound in which $L^{b1}$ and $L^{b2}$ in the formula (B) contain amide bonds), compound (B3) can be obtained by a reaction of compound (b4-1) and compound (b4-2).

$$Q^{b16}\text{-}O(O)C\text{-}L^{b18}\text{-}(OX^b)_{m2}\text{-}L^{b17}\text{-}C(O)O\text{-}Q^{b15} \quad (b4\text{-}1)$$

$$NH_2\text{-}L^{b19}\text{-}CZ^{b12}{=}CH_2 \quad (b4\text{-}2)$$

$$CH_2{=}CZ^{b12}\text{-}L^{b19}\text{-}NH—C(O)\text{-}L^{b18}\text{-}(OX^b)_{m2}\text{-}L^{b17}\text{-}C(O)—NH\text{-}L^{b19}\text{-}CZ^{b12}{=}CH_2 \quad (B3)$$

In the formula (b4-1), the definitions of $X^b$ and m2 are as defined above, $L^{b17}$ and $L^{b18}$ are each independently a divalent linking group, and $Q^{a15}$ and $Q^{b18}$ are each independently an alkyl group.

In the formula (b4-2), the definition of $Z^{b12}$ is the same as the above $Z^{b1}$ and $Z^{b2}$, and $L^{b19}$ is a divalent linking group.

In the formula (B3), the definitions of $X^b$, $Z^{b12}$, $L^{b17}$, $L^{b18}$, $L^{b19}$ and m2 are as defined above. $\text{-}L^{b17}\text{-}C(O)—NH\text{-}L^{b19}\text{-}$ in compound (B3) corresponds to $L^{b1}$ in compound (B), and -$L^{b19}$-NH—C(O)-$L^{b18}$- in compound (B3) corresponds to $L^{b2}$ in compound (B).

<Liquid Medium>

The composition of the present invention may be a composition to be used in a dry coating method or a wet coating method.

In a case where the composition of the present invention is a composition to be used in a wet coating method, the composition of the present invention preferably contains a liquid medium.

Specific examples of the liquid medium include water and an organic solvent.

The liquid medium preferably contains an organic solvent, and from the viewpoint of excellent coating properties, it is more preferred to contain an organic solvent with a boiling point of from 35 and 250° C. Here, the boiling point means the standard boiling point.

Specific examples of the organic solvent includes a fluorinated organic solvent and a non-fluorinated organic solvent, and from the viewpoint of the excellent solubility, a fluorinated organic solvent is preferred. As the organic solvent, one type may be used alone, or two or more types may be used in combination.

Specific examples of the fluorinated organic solvent, are the same as the fluorinated solvents listed for the production of compound (A).

As the non-fluorinated organic solvent, a compound consisting only of hydrogen atoms and carbon atoms, and a compound consisting only of hydrogen atoms, carbon atoms and oxygen atoms are preferred, and, specifically, a hydrocarbon-type organic solvent, a ketone-type organic solvent, an ether-type organic solvent, an ester-type organic solvent and an alcohol-type organic solvent may be mentioned.

Specific examples of the hydrocarbon-type organic solvent include hexane, heptane and cyclohexane.

Specific examples of the ketone-type organic solvent include acetone, methyl ethyl ketone and methyl isobutyl ketone.

Specific examples of the ether-type organic solvent include diethyl ether, tetrahydrofuran and tetraethylene glycol dimethyl ether.

Specific examples of the ester-type organic solvent include ethyl acetate and butyl acetate.

Specific examples of the alcohol-type organic solvent include isopropyl alcohol, ethanol and n-butanol.

<Other Components>

The composition of the present invention may contain components other than those listed above to such an extent that the effects of the present invention are not impaired.

Other components include unavoidable compounds in the production, such as byproducts formed in the production process of the first component and second component, unreacted raw materials, etc.

<Contents>

The content of the first component is, from such a viewpoint that the effects of the present invention will be superior, preferably from 20 to 99 mass %, more preferably from 30 to 90 mass %, particularly preferably from 40 to 80 mass %, to the total solid content mass of the composition of the present invention.

The content of the second component is, from such a viewpoint that the effects of the present invention will be superior, preferably from 1 to 80 mass %, more preferably from 10 to 70 mass %, particularly preferably from 20 to 60 mass %, to the total solid content mass of the composition of the present invention. Here, the content of the second component means the total of contents of compound (A) and compound (B), or in a case where only one of them is contained, its content.

The mass of the solid content of the composition is, in a case where the composition contains a liquid medium, the mass having the liquid medium removed from the composition.

The mass ratio of the content of the second component to the content of the first component (content of the second component/content of the first component) is preferably from 0.01 to 4.0, more preferably from 0.10 to 2.2, particularly preferably from 0.25 to 1.5. When the mass ratio is at least 0.01, the abrasion resistance of the surface layer will be superior. When the mass ratio is within the above range, the abrasion resistance of the surface layer will be superior.

In a case where the composition of the present invention contains the above-described liquid medium, the content of the liquid medium is preferably from 70 to 99.99 mass %, particularly preferably from 80 to 99.9 mass %, to the total mass of the composition of the present invention.

In a case where the composition of the present invention contains other components as mentioned above, the content of other components is preferably from 0 to 10 mass %, more preferably from 0 to 5 mass %, particularly preferably from 0 to 1 mass %, to the content of the specific fluorinated ether compound.

[Substrate with Surface Layer]

The substrate with a surface layer of the present invention comprises a substrate and a surface layer formed from the composition as described above. Since the substrate with a surface layer of the present invention has a surface layer formed from the composition as described above, it is excellent in abrasion resistance and also in water and oil repellency.

(Substrate)

The substrate is a substrate that may be used in contact with another article (e.g. a stylus) or a human finger, a substrate that may be held by a human finger during operation, and/or a substrate that may be placed on another article (e.g. a table), and is not particularly limited so long as it is a substrate on which it is required to provide water and oil repellency. Specific examples of the material for the substrate include metal, resin, glass, sapphire, ceramic, stone and a composite of these materials. The glass may be chemically strengthened.

As the substrate, a substrate for touch panels and a display substrate are preferred, and a substrate for touch panels is particularly preferred. It is preferred that the substrate for touch panels has translucency. The term "having translucency" means that the vertically-incident visible light transmittance in accordance with JIS R3106: 1998 (ISO9050: 1990) is 25% or more. As the material for the substrate for touch panels, glass and a transparent resin are preferred.

Further, as the substrate, preferred is glass or a resin film to be used as a building material, a decorative building material, an interior, a transportation equipment (e.g. an automobile), a sign or display, a drinking vessel or tableware, an aquarium, an ornamental equipment (e.g. a frame or box), a laboratory equipment, a furniture, an art, sport or game, as well as glass or a resin film to be used as an exterior part (excluding a display) in an equipment such as a cell phone (e.g. a smart phone), a portable information terminal, a game console, a remote control, etc.

The substrate may be a substrate having one surface or both surfaces treated with surface treatment such as corona discharge treatment, plasma treatment, plasma graft polymerization treatment, etc.

The surface layer may be formed directly on the surface of the substrate, or may be formed on the substrate via another film formed on the surface of the substrate. As a specific example of another film, a base film to be formed on the surface of the substrate, by pre-treating the substrate with a compound disclosed in paragraphs 0089 to 0095 in WO2011/016458, or $SiO_2$ or the like, may be mentioned.

(Surface Layer)

The surface layer is a layer formed from the above-described composition.

As mentioned above, the surface layer contains a condensed product having some or all of the reactive silyl groups of the specific fluorinated ether compound as the first component, undergone a hydrolysis reaction and dehydration-condensation reaction. Further, the surface layer contains the above-described second component or a component derived from it.

The thickness of the surface layer is preferably from 1 to 100 nm, particularly preferably from 1 to 50 nm. When the thickness of the surface layer is at least the above lower limit value, the effects by the surface layer will be sufficiently obtainable. When the thickness of the surface layer is at most the above upper limit value, the utilization efficiency will be high.

The thickness of the surface layer can be calculated from the oscillation period of an interference pattern of reflected X-rays, by obtaining the interference pattern by the X-ray reflectometry (XRR) using an X-ray diffractometer for thin film analysis.

[Production Method for the Substrate with a Surface Layer]

The production method for the substrate with a surface layer of the present invention is a method of forming a surface layer on the substrate by a dry coating method or a wet coating method using the above-described composition.

The substrate with a surface layer of the present invention can be produced, for example, by the following methods.

A method of treating the surface of a substrate by a dry coating method using the above-described composition not containing a liquid medium (hereinafter referred to also as the "composition for dry coating") to obtain a substrate with a surface layer, having the surface layer formed on the surface of the substrate.

A method of applying the above-described composition containing a liquid medium (hereinafter referred to also as the "composition for wet coating") on the surface of a substrate by a wet coating method, followed by drying to obtain a substrate with a surface layer, having the surface layer formed on the surface of the substrate.

Specific examples of the dry coating method include a vacuum vapor deposition method, a CVD method and a sputtering method. Among these, the vacuum vapor deposition method is suitable from the viewpoint of suppressing the decomposition of the specific fluorinated ether compound and from the viewpoint of the simplicity of the equipment. At the time of the vacuum vapor deposition, a pellet-like material having the composition for dry coating supported on a metal porous body of e.g. iron or steel, or a pellet-like material obtained by impregnating and drying the composition for wet coating, may be used.

Specific examples of the wet coating method include a spin coating method, a wipe coating method, a spray coating method, a squeegee coating method, a dip coating method, a die coating method, an inkjet method, a flow coating method, a roll coating method, a casting method, a Langmuir-Blodgett method and a gravure coating method.

The drying temperature after wet coating the composition is preferably from 20 to 200° C., particularly preferably from 80 to 160° C.

[Compound]

The compound of the present invention is a compound represented by the above formula (A) (compound (A)) or a compound represented by the above formula (B) (compound (B)), and each is a novel compound.

The details of compound (A) and compound (B) are as described for the above composition of the present invention, and therefore, their description is omitted.

As mentioned above, compound (A) and compound (B) can suitably be used in the above-described composition.

Further, compound (A) and compound (B) can also be suitably used for applications other than addition to the above-described composition.

For example, compound (A) and compound (B) can be used for alkali resistance of the substrate. Specifically, the present inventors have found that when compound (A) or compound (B) is used for the surface treatment of a substrate having a nitride on its surface, the alkali resistance of the substrate is improved. The details of the reason for this have not been clarified, but are assumed to be due to the following reasons.

As mentioned above, compound (A) has a group represented by $—CZ^{a1}═CH_2$ ($Z^{a1}$ is a fluorine atom or a trifluoromethyl group) at one terminal portion. Further, compound (B) has a group represented by $—CZ^{b1}═CH_2$ and a group represented by $CH_2═CZ^{b2}—$ ($Z^{b1}$ and $Z^{b2}$ are each independently a fluorine atom or a trifluoromethyl group), at both terminal portions.

Thus, $Z^{a1}$ in compound (A) is a group having a fluorine atom, and $Z^{b1}$ and $Z^{b2}$ in compound (B) are groups having fluorine atoms. Therefore, the water repellency near the terminal is improved as compared to a compound in which the terminal portion is $—CH_2═CH_2$. It is assumed that as a result, the alkali resistance of the substrate having a nitride is improved.

Further, compound (B) can suitably be used for a curable composition to produce rubber.

EXAMPLES

In the following, the present invention will be described in detail with reference to Examples. Ex. 1-1 to Ex. 1-5, Ex. 1-7 to Ex. 1-9, Ex. 2-1 to Ex. 2-3 are Examples of the present invention, and Ex. 1-6, Ex. 1-10 and Ex. 2-4 are Comparative Examples. However, the present invention is not limited to these Examples. The amounts of the respective components in Table given later are shown on a mass basis.

Synthesis Example 1: Synthesis of Fluorinated Ether Compound (3-1)

Synthesis of Compound (1-1)

The following compound (1-1) was obtained in accordance with the method described in Example 7 of WO2013/121984.

$$CF_3—(OCF_2CF_2—OCF_2CF_2CF_2CF_2)_n(OCF_2CF_2)—OCF_2CF_2CF_2—CH_2OH \quad (1\text{-}1)$$

The average value of the number n of repeating units is 13.

Synthesis of Compound (1-2)

The above compound (1-1) (6.80 g, 1.48 mmol), 2,6-lutidine (0.759 g, 7.08 mmol) and AE-3000 (28.0 g) were added and stirred at 0° C. Anhydrous trifluoromethanesulfonic acid (0.987 g, 3.50 mmol) was added, followed by stirring at room temperature. After washing with water, the solvent was distilled off, and flash column chromatography using silica gel was performed to obtain 6.81 g of the following compound (1-2).

$CF_3$—$(OCF_2CF_2$—$OCF_2CF_2CF_2CF_2)_n(OCF_2CF_2)$—$OCF_2CF_2CF_2$—$CH_2OTf$ (1-2)

The average value of the number n of repeating units is 13, and OTf is triflate: —O—S(═O)$_2$(—$CF_3$).

NMR spectrum of compound (1-2):

$^1$H-NMR (400 MHz, Chloroform-d) δ (ppm): 4.78 (t, J=12.3 Hz, 2H).

$^{19}$F-NMR (376 MHz, Chloroform-d) δ (ppm): −55.28, −74.11, −82.86, −88.07, −90.20, −19.84, −125.28, −126.16.

Synthesis of Compound (2-1)

Diethyldiallylmalonate (60.0 g, 250 mmol), lithium chloride (23.7 g, 559 mmol), water (6.45 g, 360 mmol) and dimethyl sulfoxide (263 g) were added and stirred at 160° C. After cooling to room temperature, water was added, followed by extraction with ethyl acetate. Hexane was added to the organic layer, followed by washing with saturated brine and drying with sodium sulfate. After filtration, the solvent was distilled off to obtain 39.5 g of the following compound (2-1).

(2-1)

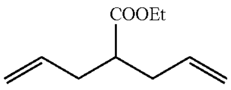

NMR spectrum of compound (2-1):

$^1$H-NMR (400 MHz, Chloroform-d) δ (ppm): (ddt, J=17.1, 10.1, 7.0 Hz, 2H), 5.06-4.94 (m, 4H), 4.09 (q, J=7.1 Hz, 2H), 2.47 (ddt, J=14.0, 8.0, 6.1 Hz, 1H), 2.33 (dt, J=14.9, 7.5 Hz, 2H), 2.22 (dt, J=14.1, 6.5 Hz, 2H), 1.21 (t, J=7.1 Hz, 3H).

Synthesis of Compound (2-2)

THF (260 mL) and diisopropylamine (41.5 mL, 294 mmol) were added, and the solution was cooled to −78° C. A n-butyl lithium hexane solution (2.76M, 96.6 mL, 294 mmol) was added, and the temperature was raised to 0° C. After stirring, the mixture was cooled to −78° C. to prepare a THF solution of lithium diisopropylamide (LDA). The above compound (2-1) (39.5 g, 235 mmol) was added to the THF solution, followed by stirring, and then allyl bromide (24.1 mL, 278 mmol) was added. The temperature was raised to 0° C., 1M hydrochloric acid (100 mL) was added, and THF was distilled off under reduced pressure. After extraction with dichloromethane, sodium sulfate was added. After filtration, the solvent was distilled off, and flash column chromatography using silica gel was performed to obtain 45.0 g of compound (2-2).

(2-2)

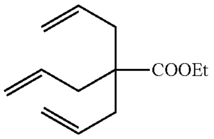

NMR spectrum of compound (2-2);

$^1$H-NMR (400 MHz, Chloroform-d) δ (ppm): 5.74-5.62 (m, 3H), 5.04 (dd, J=13.6, 1.9 Hz, 6H), 4.10 (q, J=7.1 Hz, 2H), 2.29 (d, J=7.4 Hz, 6H), 1.22 (t, J=7.1 Hz, 3H).

Synthesis of Compound (2-3)

The above compound (2-2) (45.0 g, 216 mmol) was dissolved in THF (620 mL) and cooled to 0° C. A THF solution of lithium aluminum hydride (104 mL, 260 mmol) was added, followed by stirring. Water and 15% sodium hydroxide solution were added, followed by stirring at room temperature and dilution with dichloromethane. After filtration, the solvent was distilled off, and flash column chromatography using silica gel was performed to obtain 31.3 g of the following compound (2-3).

(2-3)

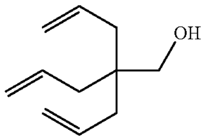

NMR spectrum of compound (2-3):

$^1$H-NMR (400 MHz, Chloroform-d) δ (ppm): 5.90-5.76 (m, 3H), 5.10-5.02 (m, 6H), 3.38 (s, 2H), 2.03 (dt, J=7.5, 1.2 Hz, 6H), 1.45 (s, 1H).

Synthesis of Compound (B1-1)

Acetonitrile (380 mL), the above compound (2-3) (31.3 g, 188 mmol), triphenylphosphine (64.3 g, 245 mmol) and carbon tetrachloride (33.9 g, 221 mmol) were added and stirred at 90° C. After concentration, ethyl acetate/hexane was added and stirred. After filtration and concentration, by distillation (70° C., 3 hPa), the following compound (B1-1) was obtained in an amount of 28.2 g.

(B1-1)

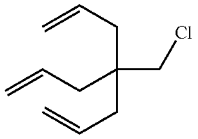

NMR spectrum of compound (B1-1):

$^1$H-NMR (400 MHz, Chloroform-d) δ (ppm): 5.83-5.67 (m, 3H), 5.16-5.01 (m, 6H), 3.32 (s, 2H), 2.05 (dt, J=7.5, 1.1 Hz, 6H).

Synthesis of Compound (B2-1)

To magnesium (2.36 g, 97.2 mmol), THF (35 mL) and iodine (0.180 g, 0.71 mmol) were added, followed by stirring at room temperature. A THF (35 mL) solution of the above compound (B1-1) (14.0 g, 75.9 mmol) was added, followed by heating and refluxing for 2 hours to prepare a solution (1.0 M) of the following compound (B2-1).

(B2-1)

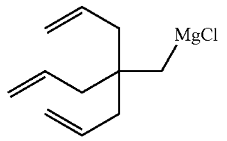

Synthesis of compound (C1-1)

$CuCl_2$ (16.0 mg, 0.119 mmol), 1-phenyl-1-propyne (0.052 g, 0.45 mmol), 1,3-bistrifluoromethylbenzene (24 mL) and the above compound (1-2) (4.00 g) were added, and then, the above compound (B2-1) (5.0 mL, 1.0 M, 5.0 mmol) was added. After stirring at room temperature, the mixture was washed with 1M hydrochloric acid and dried over sodium sulfate. After filtration, the solvent was distilled off, and AC-6000 was added. After washing with methanol, flash column chromatography using silica gel was performed to obtain 0.139 g of compound (C1-1).

$CF_3$—$(OCF_2CF_2$—$OCF_2CF_2CF_2CF_2)_n$—$OCF_2CF_2$—$OCF_2CF_2CF_2$—$CH_2CH_2$—$C[CH_2CH_2{=}C\ H_2]_3$ (C1-1)

The average value of the number n of repeating units is 10.

NMR spectrum of compound (C1-1):

$^1$H-NMR (400 MHz, Chloroform-d) δ 5.77 (ddt, J=14.9, 10.7, 7.4 Hz, 3H), 5.07-4.99 (m, 6H), 2.19-2.05 (m, 2H), 1.97 (d, J=7.4 Hz, 6H), 1.59-1.50 (m, 2H).

$^{19}$F-NMR (376 MHz, Chloroform-d) δ −55.29, −82.90, −88.13, −90.24 (d, J=8.0 Hz), −114.62, −125.34, −126.49.

Synthesis of Compound (3-1)

AC-2000 (0.89 g), the above compound (C1-1) (0.139 g), a xylene solution of platinum/1,3-divinyl-1,1,3,3-tetramethyldisiloxane complex (platinum content 2%, 5.5 mg), aniline (0.8 mg) and trimethoxysilane (22.7 mg, 0.185 mmol) were added and stirred at 40° C., and then, the solvent was distilled off under reduced pressure to obtain 0.140 g of the fluorinated ether compound (3-1).

$CF_3$—$(OCF_2CF_2$—$OCF_2CF_2CF_2CF_2)_n$—$OCF_2CF_2$—$OCF_2CF_2CF_2$—$CH_2CH_2$—$C[CH_2CH_2CH_2$—$Si(OCH_3)_3]_3$ (3-1)

The average value of the number n of repeating units is 10.

NMR spectrum of compound (3-1):

$^1$H-NMR (400 MHz, Chloroform-d) δ 3.60 (s, 27H), 2.23-1.95 (m, 2H), 1.63-1.28 (m, 14H), 0.67 (t, J=7.6 Hz, 6H).

$^{19}$H-NMR (376 MHz, Chloroform-d) δ −55.33, −82.95, −88.17, −90.13, −−90.40 (m), −114.07−−114.32 (m), −125.38, −126.04.

Synthesis Example 2: Synthesis of Fluorinated Ether Compound (3-2)

The fluorinated ether compound (3-2) was obtained in accordance with the method described in Example 6-2 of WO2017/038830.

$CF_3$—$(OCF_2CF_2$—$OCF_2CF_2CF_2CF_2)_n(OCF_2CF_2)$—$OCF_2CF_2CF_2$—$CH_2OCH_2$—$C[CH_2CH_2CH_2$—$Si(OCH_3)_3]_3$ (3-2)

The average value of the number n of repeating units is 13.

Synthesis Example 3: Synthesis of Compound (A-1)

Synthesis of Compound (a1-1)

Compound (1-1) (6.20 g), triphenylphosphine (2.00 g), 1,3-bistrifluoromethylbenzene (10 mL), carbon tetrabromide (2.00 g) and DMF (4 mL) were added and then stirred at 100° C. After filtration, the solvent was distilled off, and flash column chromatography using silica gel was performed to obtain 4.80 g of compound (a1-1).

$CF_3$—$(OCF_2CF_2$—$OCF_2CF_2CF_2CF_2)_n$—$OCF_2CF_2$—$OCF_2CF_2$—$CF_2$—$CH_2$—Br (a1-1)

The average value of the number n of repeating units is 13.

NMR spectrum of compound (a1-1):

$^1$H-NMR (400 MHz, Chloroform-d) δ 3.63 (t, J=15.6 Hz, 2H).

$^{19}$F-NMR (376 MHz, Chloroform-d) δ −55.24, −82.81, −88.04, −90.16, −13.08, −125.24.

Synthesis of Compound (A-1)

Compound (a1-1) (500 mg), 1,3-bistrifluoromethylbenzene (2 mL), acetic acid (1 mL) and zinc (500 mg) were added and then stirred at 110° C. After filtration, AC-6000 (30 mL) and 1M hydrochloric acid (3 mL) were added, followed by washing with methanol (10 mL). The solvent was distilled off to obtain 412 mg of compound (A-1).

$CF_3$—$(OCF_2CF_2$—$OCF_2CF_2CF_2CF_2)_n$—$OCF_2CF_2$—$OCF_2CF_2$—$CF{=}CH_2$ (A-1)

The average value of the number n of repeating units is 13.

NMR spectrum of compound (A-1):

$^1$H-NMR (400 MHz, Chloroform-d) δ 5.36-5.04 (m, 2H).

$^{19}$F-NMR (376 MHz, Chloroform-d) δ −55.01−−55.21 (m), −82.28−−83.04 (m), −85.95, −87.45−−88.29 (m), −89.97 (q, J=9.2 Hz), −118.62 (dtd, J=43.3, 13.9, 6.9 Hz), −120.88 (d, J=13.8 Hz), −125.02.

Synthesis Example 4: Synthesis of Compound (A-2)

Compound (1-1) (200 mg), 1, 3-bistrifluoromethylbenzene (0.2 mL), TBAI (1.6 mg), a 30% sodium hydroxide aqueous solution (8.1 mg), an 3-bromo-2-fluoroprop-1-ene (22.1 mg) were added and then stirred at 60° C. The mixture was washed with AC-6000 (60 mL) and methanol (20 mL). The solvent was distilled off, and flash column chromatography using silica gel was performed to obtain 158 mg of compound (A-2).

$CF_3$—$(OCF_2CF_2$—$OCF_2CF_2CF_2CF_2)_n$—$OCF_2CF_2$—$OCF_2CF_2CF_2$—$CH_2$—O—$CH_2$—$CF{=}CH_2$ (A-2)

The average value of the number n of repeating units is 13.

NMR spectrum of compound (A-2):

$^1$H-NMR (400 MHz, Chloroform-d) δ 4.75-4.42 (m, 2H), 4.08 (d, J=13.2 Hz, 2H), 3.98 (t, J=13.4 Hz, 2H).

$^{19}$F-NMR (376 MHz, Chloroform-d) δ −54.89, −82.39, −87.60, −89.75 (q, J=9.3 Hz), −105.23 (dq, J=47.0, 13.6 Hz), −118.86−−119.26 (m), −124.80, −126.06.

Synthesis Example 5: Synthesis of Compound (B-1)

Synthesis of Compound (a1-2)

FLUOROLINK D4000 (manufactured by Solvay Specialty Polymers, Inc.) (5.01 g), triphenylphosphine (7.5 g), 1,3-bistrifluoromethylbenzene (50 mL), carbon tetrabromide (7.5 g) and DMF (5 mL) were added and then stirred at 120° C. After filtration, the solvent was distilled off, and flash column chromatography using silica gel was performed to obtain 2.12 g of compound (a1-2).

$$Br—CH_2—CF_2\text{-}\{(OCF_2)_{n1}(OC_2F_4)_{n2}\}—O—CF_2—CH_2—Br \quad (a1\text{-}2)$$

The average value of the number n1 of repeating units is 22, and the average value of the number n2 of repeating units is 25.

NMR spectrum of compound (a1-2):

$^1$H-NMR (400 MHz, Chloroform-d) δ 3.55 (q, J=9.8 Hz, 4H).

Synthesis of Compound (B-1)

Compound (a1-2) (600 mg), 1,3-bistrifluoromethylbenzene (24 mL) and a butyl magnesium chloride THF solution (6.0 mL, 6.0 mmol) were added and then stirred at room temperature. AC-6000 (50 mL) and 1M hydrochloric acid (5 mL) were added, followed by washing with methanol (20 mL). The solvent was distilled off, and flash column chromatography using silica gel was performed to obtain 45 mg of compound (B-1).

$$H_2C{=}CF—\{(OCF_2)_{n1}(OC_2F_4)_{n2}\}—O—CF{=}CH_2 \quad (B\text{-}1)$$

The average value of the number n1 of repeating units is 22, and the average value of the number n2 of repeating units is 25.

NMR spectrum of compound (B-1):

$^1$H-NMR (400 MHz, Chloroform-d) δ 4.32-4.14 (m, 4H).

Synthesis Example 6: Synthesis of Compound (C-1)

Compound (1-1) (200 mg), 1,3-bistrifluoromethylbenzene (0.2 mL), TBAI (1.6 mg), a 30% sodium hydroxide aqueous solution (8.1 mg) and allyl bromide (22.1 mg) were added and then stirred at 60° C. The mixture was washed with AC-6000 (60 mL) and methanol (20 mL). The solvent was distilled off, and flash column chromatography using silica gel was performed to obtain 161 mg of compound (C-1).

$$CF_3—(OCF_2CF_2—OCF_2CF_2CF_2CF_2)_n—OCF_2CF_2—OCF_2CF_2CF_2—CH_2—O—CH_2—CH{=}CH_2 \quad (C\text{-}1)$$

The average value of the number n of repeating units is 13.

NMR spectrum of compound (C-1):

$^1$H-NMR (400 MHz, Chloroform-d) δ 5.80 (dt, J=16.3, 10.8, 5.7 Hz, 1H), 5.25 (dt, J=17.3, 1.6 Hz, 1H), 5.15 (dt, J=10.5, 1.5 Hz, 1H), 4.05 (d, J=5.6 Hz, 2H), 3.89 (t, J=13.7 Hz, 2H).

$^{13}$F-NMR (376 MHz, Chloroform-d) δ −55.11, −82.63, −87.86, −89.98 (q, J=9.1 Hz), −119.16 (t, J=12.1 Hz), −125.03, −126.28.

Ex. 1-1

Composition (1-1) was obtained by mixing 99 parts by mass of the fluorinated ether compound (3-1) as the first component, and 1 part of mass of the compound (A-1) as the second component.

In a molybdenum boat in a vacuum vapor deposition apparatus (VTR-350M manufactured by ULVAC KIKO, Inc.), 0.14 g of the composition (1-1) as the vapor deposition source was filled, and the inside of the vacuum vapor deposition apparatus was evacuated to at most 1×10$^{-3}$ Pa. The boat in which the composition (1-1) was placed was heated at a temperature increase rate of at most 10° C./min., and when the vapor deposition rate by the crystal oscillation type film thickness meter exceeded 1 nm/sec., the shutter was opened to start film formation on the surface of the substrate (chemically strengthened glass). When the film thickness reached approximately 50 nm, the shutter was closed to finish the film formation on the surface of the substrate. The substrate on which the composition (1-1) was deposited was heat-treated at 200° C. for 30 minutes and washed with dichloropentafluoropropane (manufactured by AGC, Inc., AK-225) to obtain a substrate with a surface layer, having the surface layer on the substrate.

Ex. 1-2 to Ex. 1-10

In the same manner as in Ex. 1-1 except that the type and content of the first and second components were changed as shown in Table 1, a substrate with a surface layer in each Ex. was obtained.

[Evaluation Tests]

Using the substrates with surface layers in Ex. 1-1 to Ex. 1-10, the following evaluation tests were conducted.

<Water Contact Angle>

The contact angle of approximately 2 μL of distilled water placed on the surface of the surface layer was measured at 20° C. by using a contact angle measuring device (DM-701, manufactured by Kyowa Interface Science, Co., Ltd.). Measurements were conducted at three different locations on the surface of the surface layer, and the average value was calculated as the initial contact angle. The 28 method was used to calculate the contact angle. Based on the initial contact angle value obtained, water repellency was evaluated in accordance with the following evaluation standards.

A: Contact angle of at least 115°

B: Contact angle of at least 105° and less than 115°

C: Contact angle of less than 105°

<Abrasion Resistance>

With respect to the surface layer, using a reciprocating traverse testing machine (manufactured by KNT) in accordance with JIS L0849: 2013 (ISO105-X12: 2001), a steel wool BONSTAR (#0000) was reciprocated under a pressure of 98.07 kPa at a speed of 320 cm/min. After the steel wool abrasion of 10,000 reciprocations, the contact angle of water on the surface layer was measured, and the abrasion resistance was evaluated in accordance with the following evaluation standards. The smaller the change in the water contact angle between before and after the abrasion test, the smaller the decrease in performance due to the abrasion, and the better the abrasion resistance. If the evaluation result is B or higher, it can be said to be excellent in the abrasion resistance.

A: Change in water contact angle is less than 2°

B: Change in water contact angle is at least 2° and less than 4°

C: Change in water contact angle is at least 4° and less than 6°

D: Change in water contact angle is at least 6°

<Results of the Evaluations

The results of the above evaluation tests are shown in Table 1.

TABLE 1

| | | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Ex. 1-10 |
|---|---|---|---|---|---|---|---|---|---|---|---|
| Compound | Type of first component | (3-1) | (3-1) | (3-1) | (3-1) | (3-1) | (3-1) | (3-1) | (3-1) | (3-2) | (3-2) |
| | Type of second component | (A-1) | (A-1) | (A-1) | (A-1) | (A-1) | — | (B-1) | (A-2) | (A-1) | — |
| | Content of first component (parts by mass) | 99 | 90 | 65 | 40 | 20 | 100 | 65 | 65 | 65 | 100 |
| | Content of second component (parts by mass) | 1 | 10 | 35 | 60 | 80 | 0 | 35 | 35 | 35 | 0 |
| Dry coating | Initial Water contact angle | A | A | A | A | A | A | A | A | A | A |
| | Abrasion resistance | B | A | A | A | B | C | A | B | B | D |

As shown in Table 1, it has been confirmed that by using a composition containing a specific fluorinated ether compound as the first component and at least one type of the second component selected from the group consisting of compound (A) and compound (B), it is possible to form a surface layer excellent in the initial water contact angle and excellent in the abrasion resistance (Ex. 1-1 to Ex. 1-5, Ex. 1-7 to Ex. 1-9).

Ex. 2-1

By a plasma CVD method using $SiH_4$ and nitrogen gas, a substrate with a nitride film, having a silicon nitride film formed on the surface of glass, was obtained.

In a molybdenum boat in a vacuum vapor deposition apparatus (VTR-350M manufactured by ULVAC KIKO, Inc.), 0.16 g of compound (A-1) as the vapor deposition source was filled, and the inside of the vacuum vapor deposition apparatus was evacuated to at most $1\times10^{-3}$ Pa. The boat in which compound (A-1) was placed was heated at a temperature increase rate of at most 10° C./min., and at the time when the vapor deposition rate by a quartz crystal oscillation type film thickness meter exceeded 1 nm/sec., the shutter was opened to start film formation on the surface of the substrate with a nitride film. When the film thickness reached approximately 50 nm, the shutter was closed to finish film formation on the surface of the substrate with a nitride film. In this way, a substrate with a surface layer, having the surface layer on the surface of the silicon nitride film, was obtained.

Ex. 2-2 to Ex. 2-4

In the same manner as in Ex. 2-1 except that the type of compound was changed as shown in Table 2, a substrate with a surface layer in each Ex. was obtained.

[Evaluation Tests]

The following evaluation tests were conducted by using the substrates with surface layers in Ex. 2-1 to Ex. 2-4.

<Water Contact Angle>

The contact angle of approximately 2 μL of distilled water placed on the surface of the surface layer was measured at 20° C. by using a contact angle measuring device (DM-701, manufactured by Kyowa Interface Science, Co., Ltd.). Measurements were conducted at three different locations on the surface of the surface layer, and the average value was calculated as the initial contact angle. The 28 method was used to calculate the contact angle. Based on the initial contact angle value obtained, water repellency was evaluated in accordance with the following evaluation standards.

A: Contact angle of at least 115°

B: Contact angle of at least 105° and less than 115°

C: Contact angle of less than 105°

<Alkali Resistance>

An aqueous alkali solution (25 mass % KOH solution, pH 14) was dropped onto the surface layer and allowed to stand for 60 minutes, then the contact angle of the water on the surface layer was measured, and the alkali resistance was evaluated in accordance with the following evaluation standards. The smaller the change in the water contact angle between before and after the alkali resistance test, the smaller the decrease in performance due to alkali, and the better the alkali resistance. If the evaluation result is B or higher, it can be said to be excellent in the alkali resistance.

A: Change in water contact angle is less than 1°

B: Change in water contact angle is at least 1° and less than 3°

C: Change in water contact angle is at least 3°

<Results of the Evaluations>

The results of the above evaluation tests are shown in Table 2.

TABLE 2

| | Type of compound | Ex. 2-1 (A-1) | Ex. 2-2 (B-1) | Ex. 2-3 (A-2) | Ex. 2-4 (C-1) |
|---|---|---|---|---|---|
| Dry coating | Initial contact Water angle | A | B | A | A |
| | Alkali resistance | A | A | B | C |

As shown in Table 2, it has been confirmed that by using the above compound (A) or compound (B), it is possible to improve the alkali resistance of the substrate having a nitride, and it is possible to impart excellent water repellency to the substrate (Ex. 2-1 to Ex. 2-3).

INDUSTRIAL APPLICABILITY

The compounds and compositions of the present invention can be used for various applications. For example, they can be used for display input devices such as touch panels, transparent glass or transparent plastic components, lenses for glasses, etc., antifouling components for kitchens, water and moisture repellent and antifouling components for electronic equipment, heat exchangers, batteries, etc., antifouling components for toiletries, components that need to repel liquid while conducting, components for water repelling, waterproofing and gliding of heat exchangers, components for low surface abrasion of vibrating sieves, inside cylinders, etc. More specific examples of use include front protection plates of displays, antireflection plates, polarizing plates, antiglare plates, or their surfaces treated with antireflection film, various instruments having display input devices that are operated on the screen with a person's finger or palm, such as touch panel sheets or touch panel displays of devices such as cell phones (e.g. smartphones), mobile information terminals, game consoles, remote controls, etc. (e.g. glass or film used for the display section, etc., as well as glass or film used for exterior parts other than the display section). In addition to the above, there are also decorative construction materials for water areas such as toilets, baths, washrooms and kitchens, waterproof materials for circuit boards, water repellent/waterproof/gliding materials for heat exchangers, water repellent materials for solar cells, waterproof/water repellent materials for printed circuit boards, waterproof/water repellent materials for electronic equipment housings and electronic components, materials for improving the insulation of power transmission lines, waterproof/water repellent materials for various filters, waterproof components for radio wave absorbers and sound absorbers, antifouling components for baths, kitchen appliances and toiletries, low surface abrasion components for vibrating sieves or cylinder interiors, machine parts, vacuum equipment parts, bearing parts, transportation equipment parts for automotive, etc., surface protection components such as tools, etc.

This application is a continuation of PCT Application No. PCT/JP2021/033357, filed on Sep. 10, 2021, which is based upon and claims the benefit of priority from Japanese Patent Application No. 2020-155260 filed on Sep. 16, 2020. The contents of those applications are incorporated herein by reference in their entireties.

What is claimed is:

1. A composition, comprising:

a first component made of a fluorinated ether compound having a poly(oxyfluoroalkylene) chain and a reactive silyl group; and a second component comprising at least one selected from the group consisting of a compound according to formula (A) and a compound according to formula (B):

$$R^{fa}—(OX^a)_{m1}\text{-}L^a\text{-}CZ^{a1}═CH_2 \quad (A)$$

where in the formula (A), $R^{fa}$ is a $C_{1-20}$ fluoroalkyl group, $X^a$ is a $C_{1-6}$ fluoroalkylene group, $L^a$ is a single bond or a divalent linking group (but excluding $(OX^a)_{na}$ where na is an integer of 1 or more), $Z^{a1}$ is a fluorine atom or a trifluoromethyl group, and m1 is an integer of 2 or more, $$CH_2═CZ^{b2}\text{-}L^{b2}\text{-}(OX^b)_{m2}\text{-}L^{b1}\text{-}CZ^{b1}═CH_2 \quad (B)$$

where in the formula (B), $X^b$ is a $C_{1-6}$ fluoroalkylene group, $L^{b1}$ and $L^{b2}$ are each independently a single bond or a divalent linking group (but excluding $(OX^b)_{nb}$ where nb is an integer of 1 or more), $Z^{b1}$ and $Z^{b2}$ are each independently a fluorine atom or a trifluoromethyl group, and m2 is an integer of 2 or more.

2. The composition according to claim 1, wherein:

the second component comprises the compound according to formula (A); and $Z^{a1}$ in the formula (A) is a fluorine atom.

3. The composition according to claim 1, wherein:

the second component comprises the compound according to formula (A); and $L^a$ in the formula (A) is an alkylene group, an etheric oxygen atom, an amide bond or a group having them combined, or a single bond.

4. The composition according to claim 3, wherein:

the second component comprises the compound according to formula (A); and $L^a$ in the formula (A) is a single bond.

5. The composition according to claim 1, wherein:

the second component comprises the compound according to formula (B); and $Z^{b1}$ and $Z^{b2}$ in the formula (B) are each a fluorine atom.

6. The composition according to claim 1, wherein:

the second component comprises the compound according to formula (B); and $L^{b1}$ and $L^{b2}$ in the formula (B) are each independently an alkylene group, an etheric oxygen atom, an amide bond or a group having them combined, or a single bond.

7. The composition according to claim 6, wherein:

the second component comprises the compound according to formula (B); and $L^{b2}$ in the formula (B) is a single bond.

8. The composition according to claim 1, wherein a mass ratio of a content of the second component to a content of the first component in the composition is from 0.01 to 4.0.

9. A substrate with a surface layer, comprising a substrate and a surface layer formed from the composition according to claim 1, on the substrate.

10. A method for producing a substrate with a surface layer, comprising forming a surface layer from the composition according to claim 1 on a substrate by a dry coating method or a wet coating method.

11. A compound according to formula (A):

$$R^{fa}—(OX^a)_{m1}\text{-}L^a\text{-}CZ^{a1}═CH_2 \quad (A)$$

where in the formula (A), $R^{fa}$ is a $C_{1-20}$ fluoroalkyl group, $X^a$ is a $C_{1-6}$ fluoroalkylene group, $L^a$ is a single bond or a divalent linking group (but excluding $(OX^a)_{na}$ where na is an integer of 1 or more), $Z^{a1}$ is a fluorine atom or a trifluoromethyl group, and m1 is an integer of 2 or more.

12. A compound according to formula (B):

$$CH_2═CZ^{b2}\text{-}L^{b2}\text{-}(OX^b)_{m2}\text{-}L^{b1}\text{-}CZ^{b1}═CH_2 \quad (B)$$

where in the formula (B), $X^b$ is a $C_{1-6}$ fluoroalkylene group, $L^{b1}$ and $L^{b2}$ are each independently a single bond or a divalent linking group (but excluding $(OX^b)_{nb}$ where nb is an integer of 1 or more), $Z^{b1}$ and $Z^{b2}$ are each independently a fluorine atom or a trifluoromethyl group, and m2 is an integer of 2 or more.

13. A method for producing a compound, comprising reacting a metal or an organometallic reagent, and a compound according to formula (a1) to obtain a compound according to formula (A):

$$R^{fa}—(OX^a)_{m1}\text{-}L^a\text{-}CFZ^{a1}—CH_2\text{-}Q^{a1} \quad (a1)$$

$$R^{fa}—(OX^a)_{m1}\text{-}L^a\text{-}CZ^{a1}═CH_2 \quad (A)$$

where in the formula (a1) and formula (A), $R^{fa}$ is a $C_{1-20}$ fluoroalkyl group, $X^a$ is a $C_{1-6}$ fluoroalkylene group, $L^a$ is a single bond or a divalent linking group (but excluding $(OX^a)_{na}$ where na is an integer of 1 or more), $Z^{a1}$ is a fluorine atom or a trifluoromethyl group, $Q^{a1}$ is a leaving group, and m1 is an integer of 2 or more.

14. A method for producing a compound, comprising reacting a metal or an organometallic reagent and a compound according to formula (b1) to obtain a compound according to formula (B):

$$Q^{b2}\text{-}CH_2\text{—}CFZ^{b2}\text{-}L^{b2}\text{-}(OX^b)_{m2}\text{-}L^{b1}\text{-}CFZ^{b1}\text{—}CH_2\text{-}Q^{b1} \quad (b1)$$

$$CH_2\text{=}CZ^{b2}\text{-}L^{b2}\text{-}(OX^b)_{m2}\text{-}L^{b1}\text{-}CZ^{b1}\text{=}CH_2 \quad (B)$$

where in the formula (b1) and formula (B), $X^b$ is a $C_{1-6}$ fluoroalkylene group, $L^{b1}$ and $L^{b2}$ are each independently a single bond or a divalent linking group (but excluding $(OX^b)_{nb}$ where nb is an integer of 1 or more), $Z^{b1}$ and $Z^{b2}$ are each independently a fluorine atom or a trifluoromethyl group, $Q^{b1}$ and $Q^{b2}$ are each independently a leaving group, and m2 is an integer of 2 or more.

15. The method according to claim 13, wherein reacting comprises reacting in the presence of a fluorinated organic solvent.

16. The method according to claim 14, wherein reacting comprises reacting in the presence of a fluorinated organic solvent.

* * * * *